(12) United States Patent  
Barton

(10) Patent No.: US 9,758,284 B2  
(45) Date of Patent: Sep. 12, 2017

(54) FLEXIBLE CONTAINER WITH INTEGRAL EXTENDED INTERNAL DISPENSING TUBE IN A STAND-UP CONFIGURATION

(71) Applicant: Barton Group, Inc., East Hampton, NY (US)

(72) Inventor: Lewis Barton, Wainscott, NY (US)

(73) Assignee: BARTON GROUP, INC., East Hampton, NY (US)

( * ) Notice: Subject to any disclaimer, the term of this patent is extended or adjusted under 35 U.S.C. 154(b) by 180 days.

(21) Appl. No.: 14/941,195

(22) Filed: Nov. 13, 2015

(65) Prior Publication Data

US 2016/0075495 A1  Mar. 17, 2016

Related U.S. Application Data

(62) Division of application No. 14/498,647, filed on Sep. 26, 2014, now Pat. No. 9,187,225.

(Continued)

(51) Int. Cl.
 *B65D 35/00* (2006.01)
 *B65D 37/00* (2006.01)
 (Continued)

(52) U.S. Cl.
 CPC .............. *B65D 75/54* (2013.01); *B29C 66/00* (2013.01); *B65D 75/008* (2013.01);
 (Continued)

(58) Field of Classification Search
 CPC ........ B65D 35/00; B65D 37/00; B65D 47/06; B65D 83/055; B65D 90/00
 (Continued)

(56) References Cited

U.S. PATENT DOCUMENTS 2,705,579 A    4/1955  Mason  
3,144,976 A *  8/1964  Freshour ................ B65D 75/20  
                                                206/229

(Continued)

FOREIGN PATENT DOCUMENTS

FR    2801283 A1    5/2001

*Primary Examiner* — Paul R Durand  
*Assistant Examiner* — Vishal Pancholi  
(74) *Attorney, Agent, or Firm* — Abelman, Frayne & Schwab

(57) ABSTRACT

A flexible thermoformed dispensing package for a flowable material includes an integrally formed dispensing tube extending from the container portion having an internal extension spaced apart from the side walls defining a recessed chamber defined by a pair of integral thermoformed walls extending from the bottom surface of the container chamber and terminating proximate the base when the package is in a vertical position to facilitate sipping of a beverage from the container portion; alternatively, a straw is placed in the dispensing tube to reach the base of the package. In another embodiment, at least one integrally formed internal dividing wall extends from the sealed end of the dispensing tube and intersects an interior wall to define separate dispensing chambers, where the sealed ends of each of the dispensing chambers can be independently opened along a weakened transverse parting line and separated into separate dispensing channels along a longitudinal parting line.

29 Claims, 19 Drawing Sheets

Related U.S. Application Data

(60) Provisional application No. 61/941,171, filed on Feb. 18, 2014, provisional application No. 61/889,675, filed on Oct. 11, 2013, provisional application No. 61/883,667, filed on Sep. 27, 2013.

(51) Int. Cl.
| | | |
|---|---|---|
| *B65D 47/10* | (2006.01) | |
| *B65D 75/54* | (2006.01) | |
| *B65D 75/00* | (2006.01) | |
| *B65D 75/32* | (2006.01) | |
| *B65D 75/52* | (2006.01) | |
| *B65D 75/56* | (2006.01) | |
| *B65D 75/58* | (2006.01) | |
| *B65D 77/28* | (2006.01) | |
| *B29C 65/00* | (2006.01) | |

(52) U.S. Cl.
CPC ......... *B65D 75/326* (2013.01); *B65D 75/327* (2013.01); *B65D 75/527* (2013.01); *B65D 75/545* (2013.01); *B65D 75/566* (2013.01); *B65D 75/5805* (2013.01); *B65D 75/5816* (2013.01); *B65D 75/5866* (2013.01); *B65D 77/283* (2013.01); *B65D 2575/3227* (2013.01); *B65D 2575/3272* (2013.01); *B65D 2575/3281* (2013.01); *B65D 2575/565* (2013.01)

(58) Field of Classification Search
USPC ........... 222/107, 211, 541.6, 541.9; 206/216, 206/229, 528, 530, 532, 534.1, 534.2, 206/538, 539, 820; 215/46–50; 220/23.4, 501, 505, 694
See application file for complete search history.

(56) References Cited

U.S. PATENT DOCUMENTS

| | | | |
|---|---|---|---|
| 3,207,420 | A | 9/1965 | Navarrete-Kindelan |
| 3,640,430 | A | 2/1972 | Roberts |
| 3,759,375 | A | 9/1973 | Nappi |
| 3,908,864 | A | 9/1975 | Capper |
| 3,913,734 | A | 10/1975 | Siegel |
| 3,940,018 | A | 2/1976 | Scholle |
| 4,069,951 | A | 1/1978 | Von Winckelmann |
| 4,301,926 | A * | 11/1981 | Chung ............... B65D 77/2052 222/107 |
| 4,314,654 | A | 2/1982 | Gaubert |
| 4,322,018 | A | 3/1982 | Rutter |
| 4,322,465 | A | 3/1982 | Webster |
| 4,416,395 | A | 11/1983 | Gaubert |
| 4,491,245 | A | 1/1985 | Jamison |
| 4,491,247 | A | 1/1985 | Nitchman et al. |
| 4,491,250 | A | 1/1985 | Liebermann |
| 4,838,429 | A | 6/1989 | Fabisiewicz et al. |
| 4,871,091 | A | 10/1989 | Preziosi |
| 4,935,283 | A | 6/1990 | Jamison |
| 4,949,878 | A | 8/1990 | Jacobi |
| 4,974,732 | A | 12/1990 | Sullivan et al. |
| 4,988,016 | A | 1/1991 | Hawkins et al. |
| 5,104,002 | A | 4/1992 | Cahlander et al. |
| 5,167,973 | A | 12/1992 | Snyder |
| 5,203,459 | A | 4/1993 | Wade |
| 5,337,539 | A | 8/1994 | Barton |
| 5,348,191 | A | 9/1994 | Dekeyser |
| 5,356,039 | A | 10/1994 | Christine et al. |
| 5,411,178 | A | 5/1995 | Roders et al. |
| 5,632,416 | A | 5/1997 | Lane, Jr. et al. |
| 5,647,511 | A | 7/1997 | Bond |
| 5,735,423 | A | 4/1998 | Black |
| 5,931,345 | A | 8/1999 | Lane, Jr. et al. |
| 6,094,886 | A | 8/2000 | Poignant |
| 6,196,420 | B1 | 3/2001 | Gutierrez et al. |
| 6,360,916 | B1 | 3/2002 | Sokolsky et al. |
| 6,561,383 | B1 | 5/2003 | Reddy et al. |
| 6,620,436 | B1 | 9/2003 | Rolf |
| 6,624,130 | B2 | 9/2003 | Giblin et al. |
| 6,651,848 | B1 | 11/2003 | Redmond |
| 6,779,657 | B2 | 8/2004 | Mainwaring et al. |
| 6,883,683 | B1 | 4/2005 | Cunningham et al. |
| D512,651 | S | 12/2005 | Stefandl |
| 7,021,495 | B2 | 4/2006 | De Laforcade |
| 7,334,702 | B2 | 2/2008 | Cunningham et al. |
| 7,690,555 | B2 | 4/2010 | Churvis et al. |
| 8,141,709 | B2 | 3/2012 | Klaus |
| 8,430,266 | B2 | 4/2013 | Barton |
| 9,187,225 | B2 | 11/2015 | Barton |
| 2003/0029884 | A1 | 2/2003 | Rau |
| 2003/0231808 | A1 | 12/2003 | Machacek et al. |
| 2004/0118859 | A1 | 6/2004 | Stefandl |
| 2006/0086640 | A1 | 4/2006 | Luciano, Jr. et al. |
| 2007/0228073 | A1 | 10/2007 | Mazzarino |
| 2007/0231431 | A1 | 10/2007 | Roche et al. |
| 2010/0086239 | A1 | 4/2010 | Latour |
| 2011/0272421 | A1 | 11/2011 | Barton |

* cited by examiner

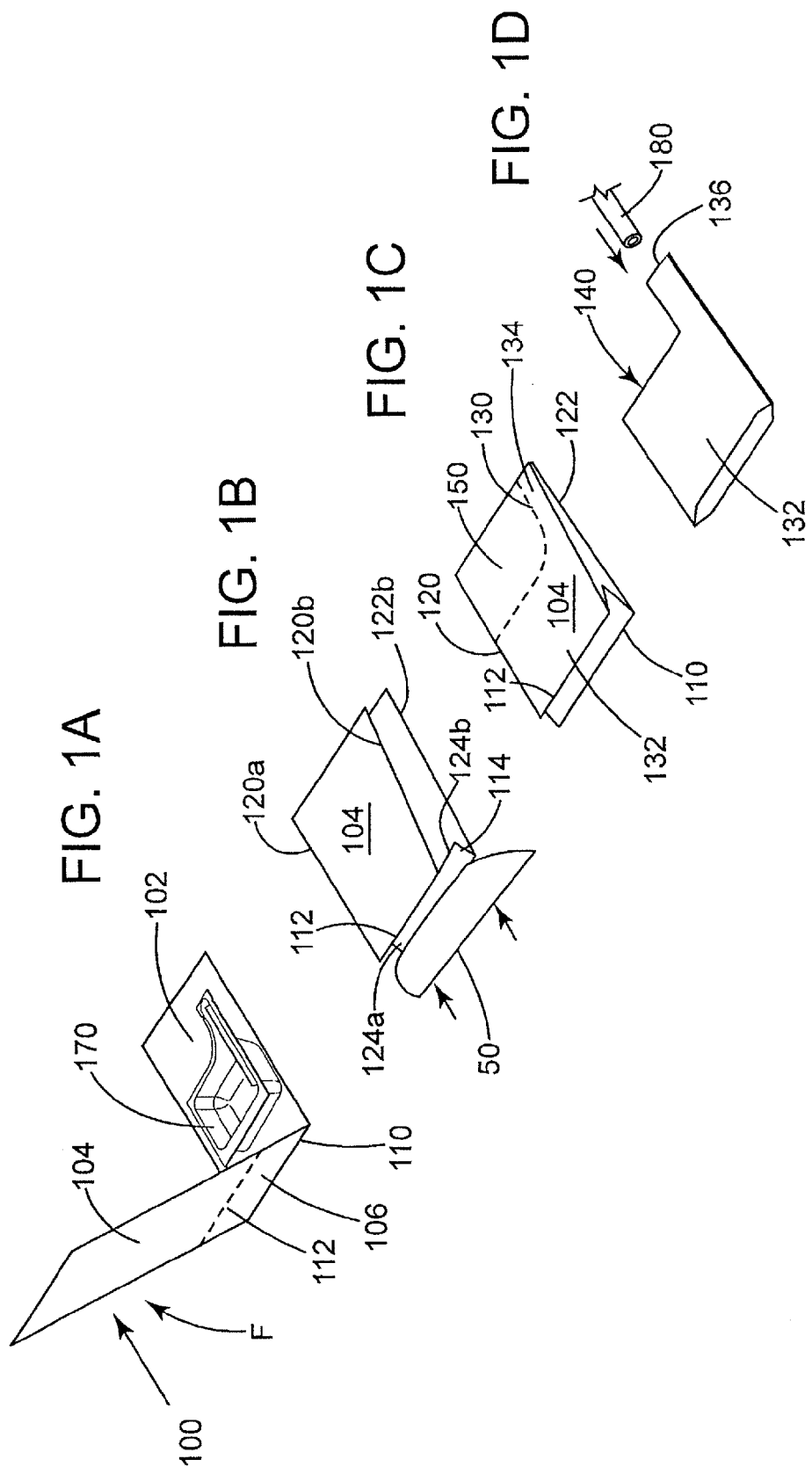

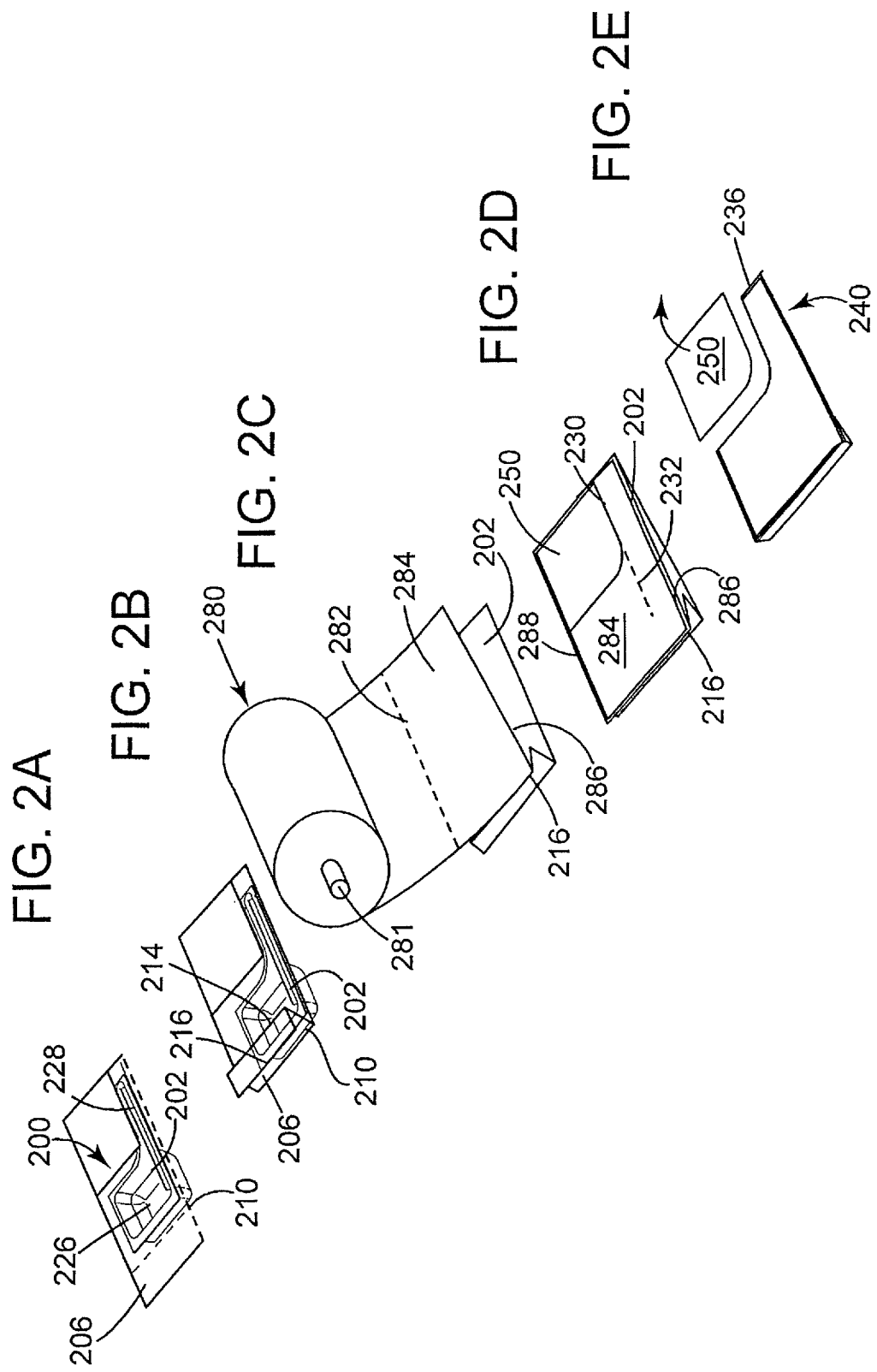

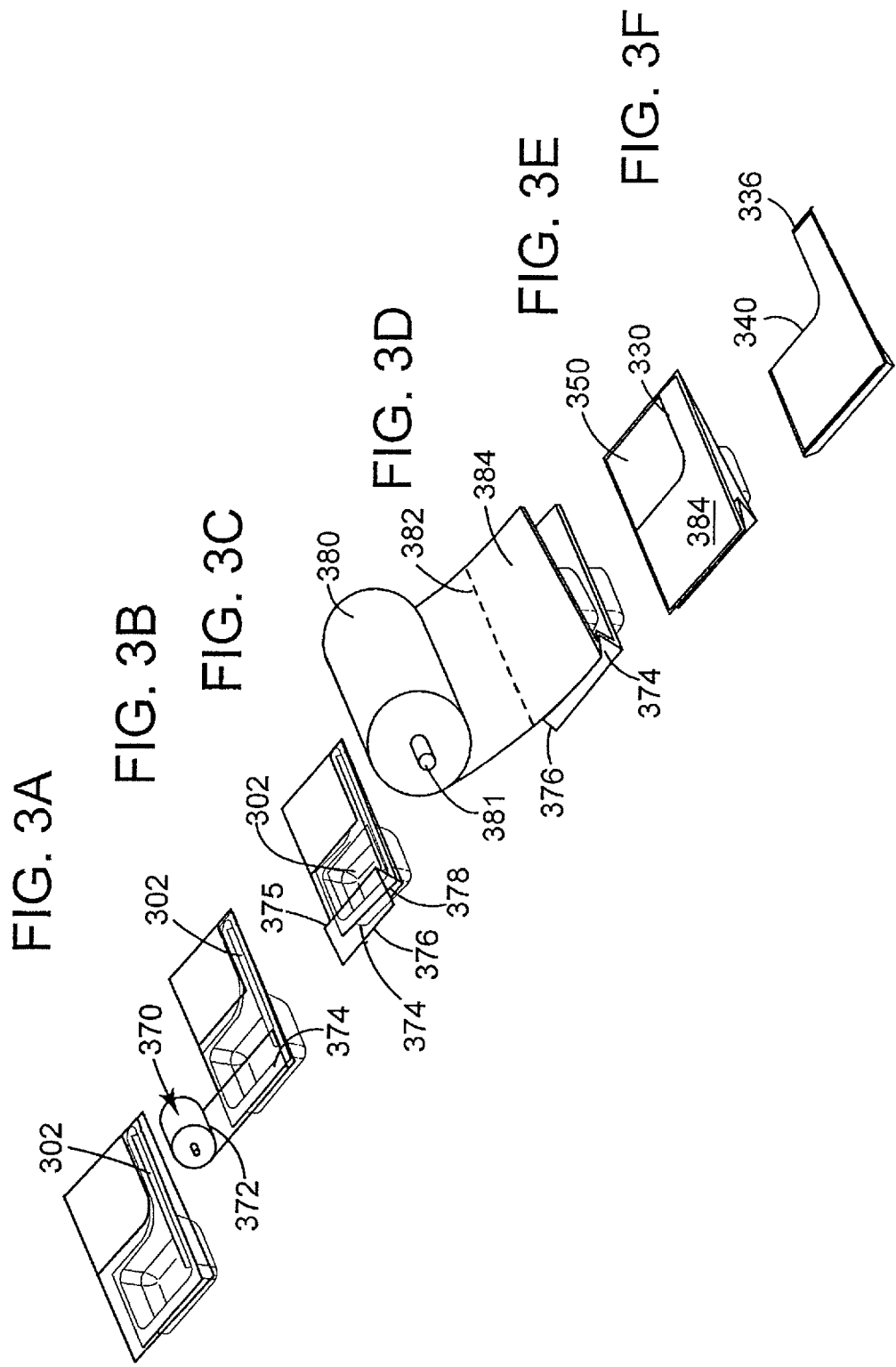

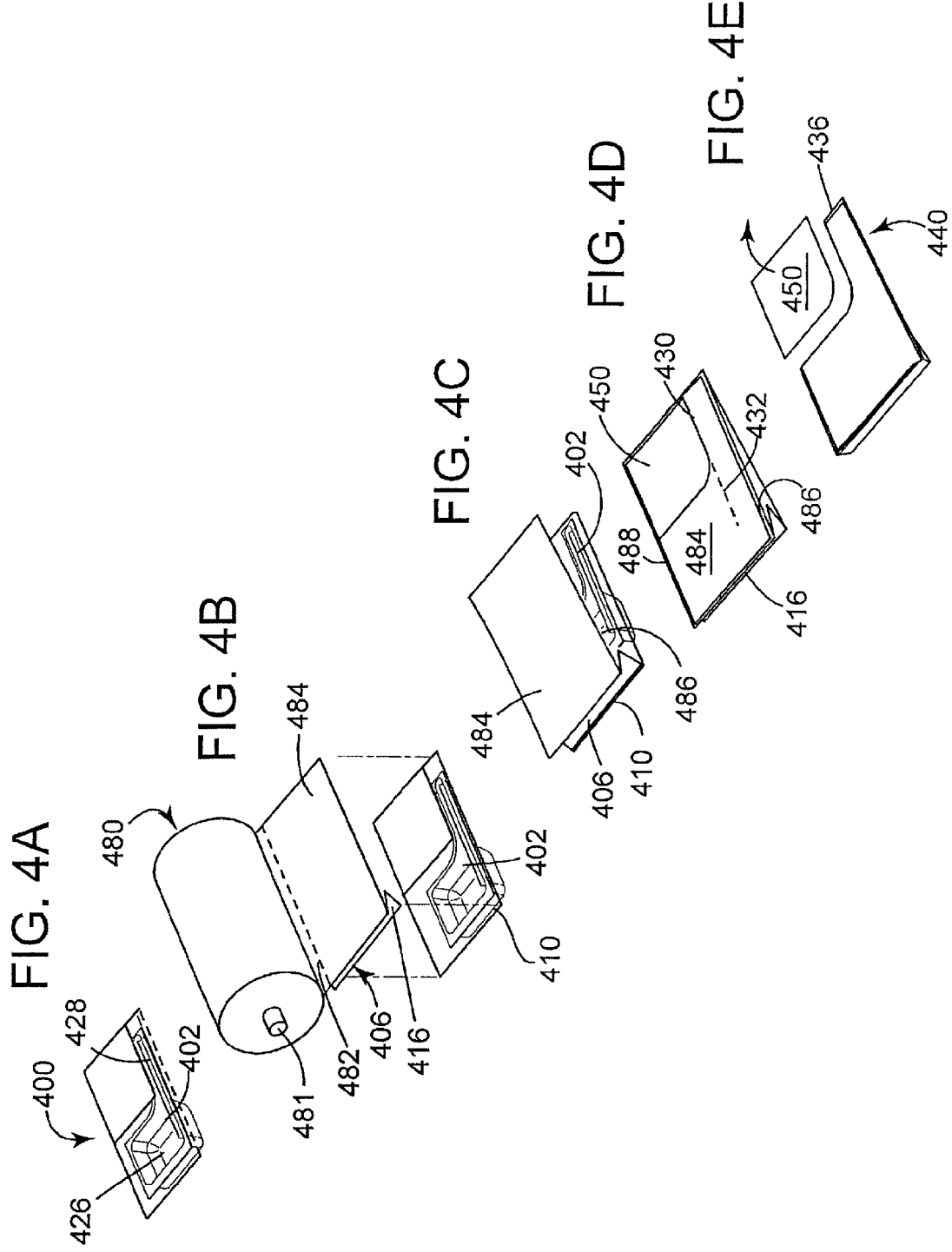

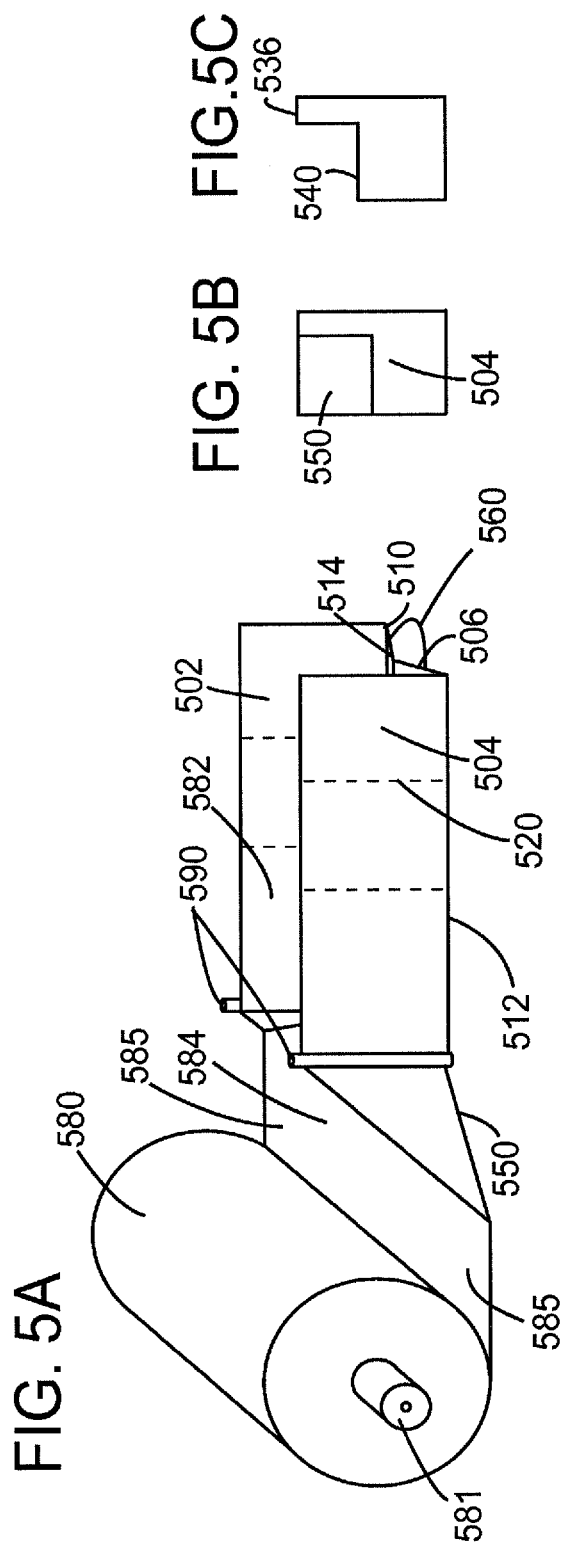

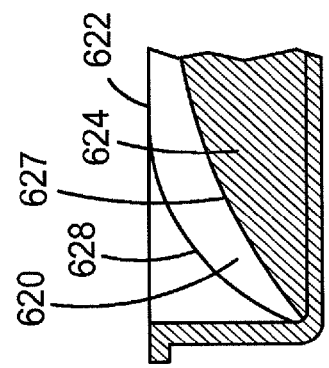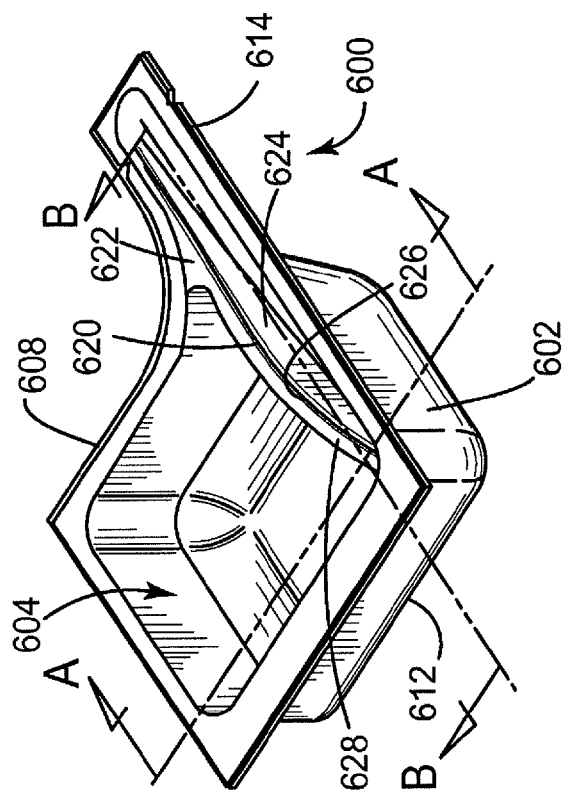

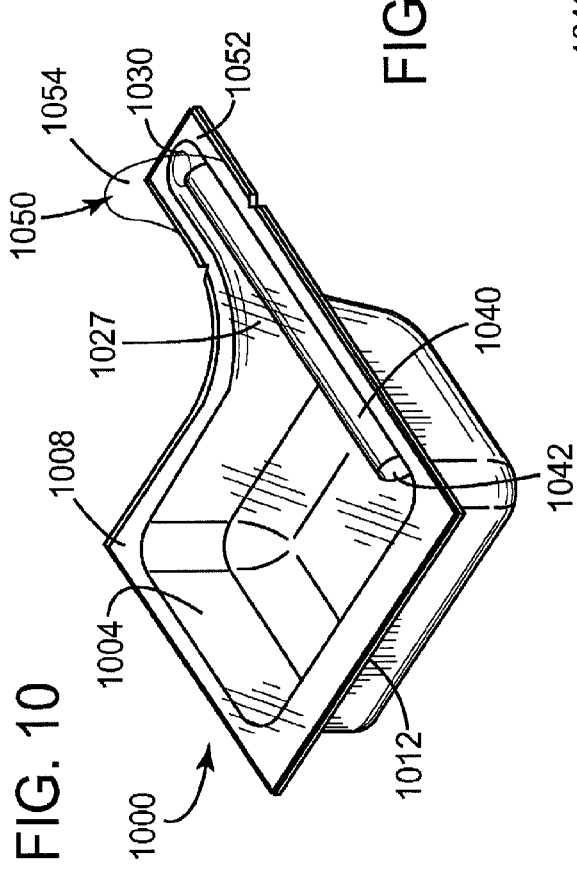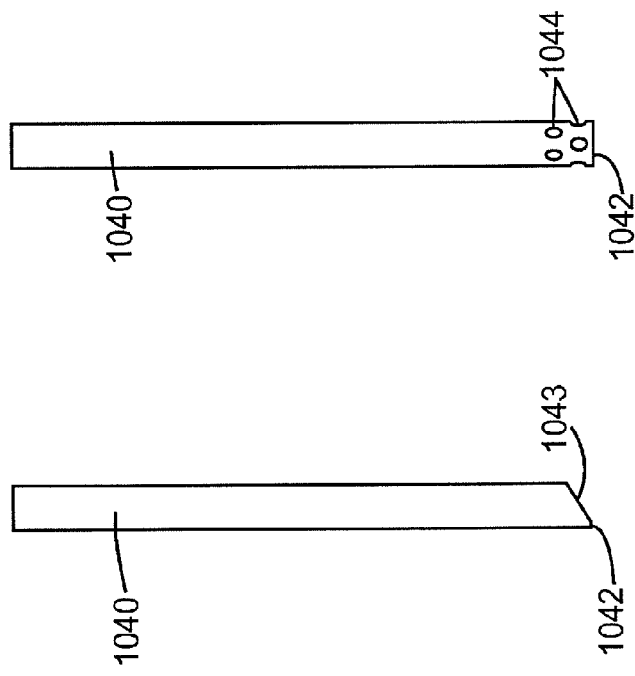

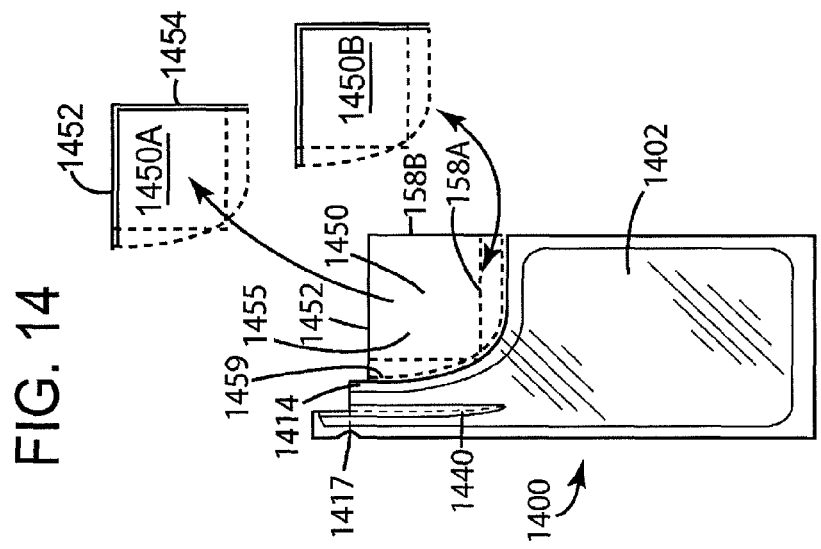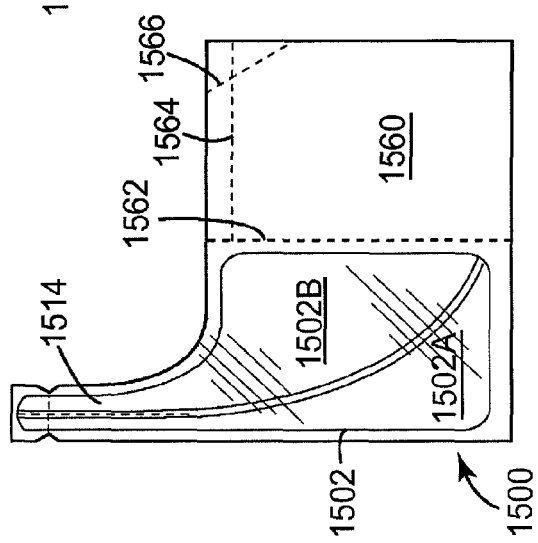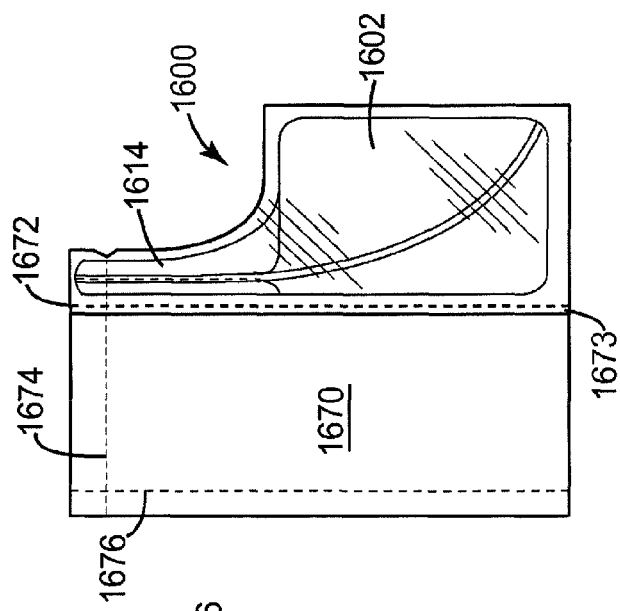

FLEXIBLE CONTAINER WITH INTEGRAL EXTENDED INTERNAL DISPENSING TUBE IN A STAND-UP CONFIGURATION

RELATED APPLICATIONS

This application is a divisional of allowed U.S. Ser. No. 14/498,647 filed Sep. 26, 2014 which claims priority to U.S. Ser. No. 61/941,171 filed Feb. 18, 2014, U.S. Ser. No. 61/889,675 filed Oct. 11, 2013 and U.S. Ser. No. 61/883,667 filed Sep. 27, 2013, the disclosures of which are incorporated herein by reference.

FIELD OF INVENTION

The present invention is directed to improved flexible packaging for liquids and viscous flowable products that includes an integral tube for withdrawing or dispensing the contents, and to methods of manufacture.

BACKGROUND OF THE INVENTION

The retail and food service industries are large-volume purveyors of beverages and other flowable food products such as syrups and condiments in a variety of container configurations that are sold to or provided for use by consumers. Many of these products can advantageously be sold as single-service packages for beverages, including water (both natural and flavored), ice teas, energy drinks, non-carbonated fruit-flavored drinks and concentrated drink mixes, to name just a few. In some cases, single-service packages of the prior art have a separate sealed port that allows the user to insert a separate rigid straw that is removably attached to the package; or the packaging utilizes various types of rigid valves, screw caps and/or other types of accessory opening devices that allow access to, and dispensing of the contents of the package by the user.

These types of prior art packages have several drawbacks. First, due to the complexity of multiple cast rigid plastic parts, high cost is associated with their production. Second, the cost of adding these parts during package formation and filling increases the overall cost of the package. Third, in the case of add-ons like separate straws, a common consumer complaint is the loss of or damage to the straw.

In addition to providing consumers with a low cost, easy-to-use package for beverages, there are other instances where it may be necessary and/or beneficial to provide such packaging. For example, packaging of pre-measured quantities of liquid ingredients to be included in pre-packaged food and cake mixes would reduce the need for the consumer to store these liquids at home and would shorten the preparation time and utensils needed prior to cooking or baking the product. Other examples are single use, pre-measured liquid seasonings and sauces for use by campers, outdoor cooks and the military.

Another application is in the field of specialized pharmaceuticals where the compounding of preparations by a pharmacist at the time of dispensing or by medical personnel at the time of administration to the patient requires precise dosing of ingredients or other consumables because the compounded medicinal has a short shelf life. Industrial applications include light-weight, but robust packaging having an integral flexible dispenser for lubricants and greases required for servicing equipment in remote locations, as well as components used in preparing two-part epoxies and other polymer compositions that have a short pot life. This type of packaging has the additional advantage of ease of disposal of the empty package after the contents have been dispensed.

Flexible packaging that includes an integral dispensing tube that is suitable for transporting and permitting the user to withdraw or dispense a liquid or a flowable viscous substance through the dispensing tube and methods for their manufacture are disclosed and claimed in U.S. Pat. No. 8,381,941 and related U.S. Pat. No. 8,430,266, the disclosures of which are incorporated herein by reference. The flexible dispensing package of the '941 patent can advantageously be formed and filled with any desired dispensable liquid or flowable substance utilizing horizontal form-fill-seal ("HFFS") machines which are well known in the packaging industry. The construction, use and process of operation of HFFS equipment is described in U.S. Pat. No. 4,322,465, the disclosure of which is also incorporated herein by reference. The container portion of the package is thermoformed and a top sheet is heat-sealed around the periphery to provide the fluid-tight flexible dispensing package. Various packaging machine manufacturers and distributors in the U.S. and outside of the U.S. have posted animations at their respective websites that illustrate a variety of prior art methods and systems for producing thermoformed packages, blister packs, and the like. A typical informational posting for such packaging machines is found at ulmapackaging.com.

The flexible dispensing package of the type described in U.S. Pat. No. 8,381,941 are ideally suited for dispensing their contents when oriented vertically with the dispensing tube below the container portion so that gravity assists in causing the contents to be dispensed and flow through the tube after the sealed end is removed by the user. However, in its use as a single-serve beverage container where the consumer is accustomed to holding the container vertically and sipping the contents through a straw projecting up from the container, a problem exists in withdrawing all of the beverage from the package described in the '941 patent.

A further problem that arises in using the package of the '941 patent for beverages is how to withdraw substantially all of the liquid from the container portion without tilting the container portion up above the tube in order to drain the liquid from the container.

An additional problem presented by the package of the '941 patent is that its configuration does not lend itself to the customary retail supermarket setting of displaying the container on a horizontal shelf with the label or a principal display panel facing out to the prospective purchaser, and being stocked in a rank-and-file orientation for easy removal from, and for ease of efficiently restocking of the shelf.

SUMMARY OF THE INVENTION

The above problems are resolved and numerous other advantages and benefits are realized by the improved flexible package with an integral dispensing tube of the present invention in which an additional internal channel is integrally formed in the container portion, beginning at the base portion of the external dispensing tube to provide a contiguous internal extension in fluid communication with the dispersing tube and that terminates opposite the dispensing tube proximate the bottom of the container portion. This allows the user to sip the external open end of the dispensing tube and draw the liquid from the bottom region of the container portion as would be possible with a separate straw of the prior art containers. In the configuration where the dispensing tube is positioned so that one side is aligned with and formed by the seal or fold line that joins the opposing sides of the polymer webs or sheets from which the package is constituted, a single linear heat seal preferably extends generally parallel to the adjacent side seal or fold line. When the package is configured with the dispensing tube in a central position or displaced from a side wall of the container portion, a pair of generally parallel heat-sealed lines extends from the base of the dispensing tube to form the internal extension, or straw. In both cases, the heat-sealed line or lines terminate proximate the bottom of the container portion and are displaced from the bottom in a distance that is sufficient to allow the flowable product to enter the internal extension as the contents are withdrawn by the user.

Thus, an embodiment of the present invention broadly comprehends an improvement to the flexible package having a dispensing tube as described in U.S. Pat. No. 8,381,941 by providing it with an internal extension to the dispensing tube that is integrally formed with the container portion from the same polymeric sheet or web onto which is then applied a top or cover sheet that is heat-sealed around the periphery and also along a line, or lines, extending from the base of the external dispensing tube to a location proximate the bottom wall of the package opposite the dispensing tube, while leaving an opening for fluid communication between the container and the lower portion of the internal extension, or straw.

In another aspect of the invention, the thermoformed bottom sheet of the package is joined to a modified top sheet that is provided with an additional gusseted base extension positioned between the sidewalls, thereby providing the filled package with a generally flat supporting base and a so-called stand-up configuration with the integral flexible dispensing tube extending from the top of the container portion of the package. As will be explained in more detail below, the top sheet with the gusset can be formed and secured to the thermoformed portion of the package using a number of methods that are carried out on existing automated package forming machines.

Thus, this second aspect of the present invention broadly comprehends forming a gusset in the base portion that is heat-sealed to the thermoformed portion in order to produce a stand-up package configuration that has an additional volumetric capacity achieved by increasing its depth while maintaining the same relative height and width dimensions in the vertical or use position. This embodiment resolves the problem for the retail shelf display and stocking of a flexible beverage container with an integral dispensing straw or tube by providing a self supporting gusseted product configuration.

As will be understood by one of ordinary skill in the art, the separate improvements described above can advantageously be combined in a gusseted package provided with an internal extension of the dispensing tube terminating in an open end adjacent to the bottom of the container portion that functions in use as an integrally formed straw.

In another embodiment of the invention, the dispensing package is integrally formed with, or joined to an additional compartment that is configured and dimensioned to receive the same or a different product. For example, a generally rectilinear open sleeve or a completely closed or sealed packet or compartment is formed and joined to a margin of the dispensing package. A sealed packet can include medication in the form of a pill or tablet, along with printed instructions for its use. The exterior of the packet or sleeve can be printed with identifying indicia, advertising, a logo, a coupon and/or pertinent information. This configuration can also be employed to include a small toy or novelty, a premium, candy, or a snack item in order to compliment and/or enhance interest in the beverage or other product in the dispensing package.

For the purpose of this description, it is to be understood that the base of the package of the invention is opposite the dispensing tube, and the height is defined as the dimension between the base and exterior top of the container portion. The width is the dimension across the front of the package transverse to the height and the depth is the remaining dimension, which will vary from top to base if the package is gusseted.

As used herein, the terms "web" and "sheet" will be understood to refer to the polymeric material(s) that are preferably used to form the package(s) of the present invention. As will be understood by those of ordinary skill in the art, the polymeric material(s) are advantageously provided to an automated package forming and filling machine in rolls and fed to the machine as a continuous web. The web can be thermoformed in conjunction with a vacuum and/or a mechanical plug, then filled and heat-sealed to form the package from which any unwanted material is trimmed or die-cut, and by which multiple-formed packages joined to the web are separated into individual packages, generally as a final step. In any event, it will be understood that the terms sheet and web may be used interchangeably and that the meaning will be apparent from the context to one of ordinary skill in the art. Optionally, for specific applications and systems the web can be cut on the fly to provide sheets to the machine and processed as described above. The use of sheets can be employed for relatively small runs of a given packaging configuration, for prototype development and/or where capital costs of continuous-run form and fill production equipment are of concern.

As used herein, the term "lidding" material, sheet or web means that portion of the package which covers the thermoformed portion and which is heat-sealed about its periphery to form the fluid-tight package.

As discussed below, the layout or design of the dies and other elements of the package-forming system for a particular packaging configuration that is to be mass produced, is selected with a view to minimizing the scrap or waste produced. Examples of optimizing the layout of the package-forming dies are disclosed in U.S. Pat. No. 8,381,941. The configuration of a so-called "nested pair" that is illustrated there is one such example.

It will also be understood by those of ordinary skill in the art that flexible dispensing packages used for beverages sold at retail establishments can use polymeric web materials of the same or different thickness and that the choice can be based on economic considerations. That is, use of one sheet or web that is of a thinner gauge than the thermoformed sheet will incur less cost per square unit of measure flexible packages used for lubricants, medicinal substances or in industrial applications can also require heavier gauge materials, which also can be of the same or different thicknesses.

The packages of the present invention can also be made from aluminum foils of various thicknesses that have been coated with, or laminated to a heat sealable polymeric material to provide a web or sheet that will retain a fold line, or a dead fold, or to serve other aesthetic and/or functional purposes.

Divided Dispensing Tube and Partitioned Container

In another embodiment of the present invention, the free end of the dispensing tube is divided into at least two separate dispensing channels extending from the sealed or closed end toward the container portion of the package. The channels can be formed by providing one or more longitudinal seals between the outside edges of the dispensing tube, that is, extending along the length of the tube. The width and/or position of the sealed area can be used to adjust the size of the respective dispensing channels, e.g., to control the flow rate during dispensing. Two parallel longitudinal seals along the dispensing tube can be spaced to provide, e.g., three parallel dispensing channels: small, medium and large.

The additional longitudinal seal or seals of this embodiment can extend a predetermined length from the sealed free end of the tube, and to a position proximate the container portion. For convenience, an embodiment with two dispensing channels will be described, and it is to be understood that the description will be generally applicable to one or more additional tubes. The length of the dispensing tube and the longitudinal sealed area can be determined based upon the use of this specialized form of packaging to permit the manual opening of the free end to permit the contents to be dispensed from one or both of the adjacent channels separately or simultaneously. In a preferred embodiment, the additional longitudinal seal can be split along its centerline for a portion or along its entire length in order to facilitate the opening of one of the channels, e.g., along a tear or score line, while the adjacent channel remains sealed. Alternatively, slit perforations can be provided along the centerline of the seal to permit the user to manually separate the adjacent channels in preparation for opening the free end(s). The resulting product of either embodiment is a package having two separate dispensing channels for accessing the contents of the container. Removing the sealed end from only one of the channels provides the user with a means of more slowly dispensing or of more easily controlling the flow rate, e.g., of a measured volume of the flowable contents.

In another embodiment of the invention, the additional longitudinal seal or seals that divides the dispensing tube is extended as a wall through the interior of the container portion, thereby dividing it into two separate volumes. This permits the package to be filled with, and separately dispense the contents of each portion of the container. As will be apparent, the same or a different liquid or other flowable substance can be placed in the two or more separate package compartments for eventual use at the time of its manufacture.

The embodiment of the split dispensing tube, each portion of which is individually sealed and therefore can be separately opened, overcomes the disadvantage of a single compartment dispensing tube that cannot be resealed or closed in the event that only a portion of the contents of the package are desired or required for use in a particular application. With the divided container, two portions are available, some of which can be used upon opening and some later, thereby solving the problem of a recloseable dispensing tube. Bisecting the dispensing tube to form two adjacent dispensing channels provides a container that can be used for, e.g., two different flavors, or products that are typically sold in separate or highly specialized, and therefore expensive, containers for mixing of two-part ingredients at the time of use. Examples of potential uses for the container having a dividing wall include epoxy resin and its hardener in the appropriate volumetric proportions based on the capacity of the individual portions of the container as defined by the interior wall. Other uses include salad oil and vinegar that can be mixed in any proportion desired by an individual user who wishes the convenience of an essentially disposable package, as well as combinations of condiments, such mustard and ketchup, and the like. The divided container with separate dispensing channels for each compartment provides lightweight, inexpensive and convenient packaging for such conventional cosmetic and personal care combinations as hair shampoo and conditioner, face lotion and body lotion, hair mousse and after shave or cologne, and the like.

Additional Features for the Dispensing Package with Integral Flexible Dispensing Tube In another embodiment, the container portion of the dispensing package is configured with a sealed portion that contains no product in order to provide a gripping surface, e.g., to be held between the thumb and one or two fingers, while the user first removes the sealed end along a tear line and then sips the open dispensing tube to withdraw the liquid contents.

In another embodiment, the unfilled separate portion of the container is fully sealed and appears as a flat area. This area can be used in the same way to provide a gripping surface, but reduces the bulk of the empty package.

BRIEF DESCRIPTION OF THE DRAWINGS

The invention will be described in further detail below and with reference to the attached drawings in which:

FIGS. 1A-1D schematically illustrate an embodiment of the invention and the step-wise method of manufacture of a package with a bottom gusset by an automated machine where the polymeric material is in the form of a single integral sheet;

FIGS. 2A-2E schematically illustrate another embodiment of the invention and the step-wise method of manufacture of a package with a bottom gusset by an automated machine utilizing two separate sheets or webs of polymeric material;

FIGS. 3A-3F schematically illustrate an embodiment of the invention and the step-wise method of manufacture of a package with a bottom gusset by an automated machine where the polymeric material is in the form of three separate sheets or webs of polymeric material.

FIGS. 4A-4E schematically illustrate another embodiment of the method of manufacture of a gusseted package utilizing two separate sheets or webs;

FIGS. 5A-5C schematically illustrates an embodiment of the invention and the step-wise method for the continuous manufacture of a package with a bottom gusset by an automated machine where the polymeric material is in the form of a single web of polymeric material that is drawn through a forming apparatus that configures the web to form the bottom gusset, after which the opposing sidewalls are brought into overlaying relation and the edges heat-sealed and then die cut;

FIGS. 6 and 6A-6G include perspective views of a portion of three embodiments of vacuum-forming molds that are configured to receive a sheet of polymeric material to form the straw or dispensing tube internal extension that terminates in an opening proximate the interior bottom of the container of the flexible dispensing package;

FIGS. 6A and 6B are sectional views taken along section lines A-A and B-B, respectively, of FIG. 6;

FIGS. 6C-6E are views of another embodiment of the invention showing the thermoformed container and dispensing tube portions with the internal extensions;

FIG. 6F is a plan view of a die for producing two thermoformed portions corresponding to FIGS. 6C-6E;

FIG. 6G is a plan view of a die for producing an embodiment of the invention in which the dispensing tube is displaced from the side of the container portion;

FIG. 10 illustrates an embodiment of the invention in which a preformed straw is incorporated in the dispensing package during manufacture;

FIGS. 10A and 10B are schematic side elevation views of preformed straws suitable for use in the embodiment of FIG. 10;

FIGS. 14, 15 and 16 are simplified schematic front elevation views of a dispensing package of the invention to which is attached, respectively, an integral panel, pocket or sleeve, which, optionally, can be separated from the dispensing package;

DETAILED DESCRIPTION OF THE PREFERRED EMBODIMENTS

Figure 6C:
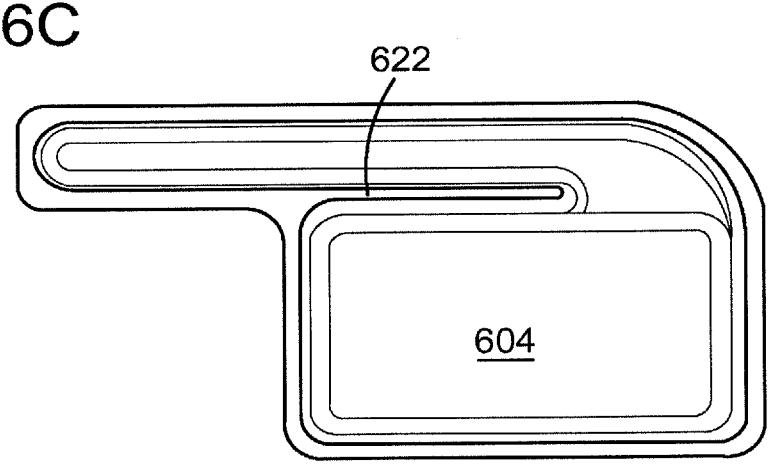

Referring now to the series of simplified schematic illustrations of FIG. 1A to FIG. 1D, the method of producing a flexible thermoformed and gusseted package with an integral dispensing tube or straw will be described. It will be understood that the steps illustrated are performed on a web or a sheet cut from a web of flexible polymeric material that can be heat-sealed where desired to define a fluid-tight seal and that the material can be readily die cut. As will be understood by those familiar with the packaging art, the packaging material is advantageously printed while in the form of a web that is unwound for the purposes of printing and then rewound for the eventual manufacturing steps that are to be described. As used in this description and in the claims which follow, it is to be understood that the term "sheet" is intended to include a web, as well as a sheet cut from a web during the step-wise manufacture of the product.

The package blank 100 is defined as an area of a preprinted roll or web consisting of a top or cover section or panel 104, rear section 102 and a gusset section 106 with transverse fold lines 110, 112 defining the respective sections. The bottom section of the web defining the vacuum thermoformed container and dispensing tube portions, including the internal extension, are continuously advanced to a position above the thermoforming station of the automated machine. For convenience and in the interest of clarity, the mold 170 is shown in solid lines positioned below the bottom sheet 102. It will also be understood that the bottom sheet 102 assumes the corresponding configuration during the subsequent steps. The bottom section 102 is heated and thereby softened to facilitate the thermoforming step, which includes the application of a vacuum and, optionally, the use of a plug to fully form the container portion and one side of the dispensing tube portion. As will be explained in more detail below with reference to the series of FIG. 6, the extended internal straw portion can be formed in part by the settling or draping of the hot web between the die elements, and is assisted by the vacuum drawn on the mold.

After the thermoforming step, the sequence of folding the portion of the web 100 to form the gusset having a central transverse fold line 114 as illustrated in the partially folded package of FIG. 1B can be performed in a number of different sequences. For example, sections 104 and 106 can be rotated around fold line 110 in the direction indicated by arrow F, and the edge or blade of the fold-forming plow tool 50 advanced into gusset section 106 to form the interior fold line 114 in gusset section 106. Thereafter, cover section 104 is folded along line 112 and brought into a superposed position over bottom section 102. In the step illustrated in FIG. 1C, the free edges 120a, 120b, 122b, 124a, 124b, respectively, of sections 102, 104 and 106 are heat-sealed to form the gusseted package. In one embodiment, an additional heat sealing of the fold lines 110 and 112 is performed to provide a more rigid rim or base supporting portion of the stand-up package in order to give it greater stability for shelf display and when in use as a beverage container. With further reference to FIG. 1C, bottom and top sections 102, 104 are also heat-sealed along broken line 130 which serves to form the container portion identified generally as 132 and the elongated flexible dispensing tube 134. As will be understood by reference to FIG. 1D, the remaining corner portion 150 that is bounded by the heat-sealed line 130 is removed and discarded, as by die cutting to provide finished package 140.

As explained above, the second half of the section is folded over the first half in a manner that forms a gusset on the base of the package in its formative stage. This technique of folding "on-the-fly" using a device generally known as a "former", "plow" or "mandrel" that is an accessory to the main packaging machine is widely known and used in the packaging machinery field, it is identified above illustratively at plow 50.

The folded sheet containing the gusset is then sealed around three sides of the entire folded, gusseted sections. The end that has been gusseted requires no seal since it is an integral folded piece of the same material. In the area of the gusset, the heat-sealing device, e.g., heated dies, seal four layers of the material, i.e., top, bottom and both sides of the gusset.

The now fully-formed gusseted package 140 is filled, e.g., in a vertical configuration by insertion of an elongated tube of a filling device 180 in the open end of flexible dispensing tube 134. After introduction of a predetermined measured quantity of liquid, e.g., a beverage, the filling device 180 is removed and dispensing tube 134 is heat-sealed at its upper end 136 while in the vertical position and provided with notches as described in more detail below to facilitate manual removal of the sealed end portion by the user.

In an alternative embodiment, the thermoformed container portion is advantageously filled before the top sheet or web is positioned and sealed as described in the '941 patent. Some efficiency in production is achieved by avoiding the additional filling and sealing steps after the package is fully formed.

In a configuration where the gusset provides a significant liquid capacity, the package can be filled through an opening in the top adjacent the dispensing tube, which is then heat-sealed to complete the package.

Referring now generally to the embodiment of FIG. 2 and the series of assembly steps schematically illustrated in FIGS. 2A-2E, to separate webs or sheets, preferably of different thicknesses, are employed to produce the package of the invention. The package is formed from a first or bottom sheet of a first thickness that includes a gusset extension portion. As the bottom sheet 200 indexes along the work stations of a horizontal thermoform-fill-seal machine, the accessory device folds the flap 206 into a V-shape that becomes the bottom gusset of the package. In a subsequent step, a second or top cover sheet 280, that is preferably of a second thickness, is positioned in opposing relation to the bottom sheet and is heat-sealed to the free end of the folded gusset extension. As will be understood by one of ordinary skill in the art, in order to achieve maximum productivity and efficiency based on the specific machine used in the process, the thermoformed container portion is filled, so that in the final stage of production the package 240 is complete. This filling step generally occurs after the cavity has been formed, but before the top cover sheet is sealed to the periphery of the bottom sheet. Further, when the top sheet is sealed to the bottom sheet, the fully-formed and sealed gusset and integral top sheet are heat sealed simultaneously.

Referring specifically to FIG. 2A, the thermoformed portion 202 includes an integral gusset portion 206 joined as a flap along fold line 210 to the base which is opposite the dispensing tube portion 228. As shown in FIG. 2B, the gusset flap 206 is folded into a position over the preformed web 202 and then again along fold line 214 to form the gusset pleat. Referring to FIG. 2C, in the next step, a rolled web 280 supported on mandrel 281 is positioned adjacent the assembly station in order to position a second or top sheet 284 in contact with the exposed surface 216 and superposed above thermoformed bottom web 202. Sheet 284 is severed in the final die-cutting operation from web 280 along a transverse line 282 which corresponds to the opposing edge of thermoformed web 202. As will be apparent to one of ordinary skill in the art, the forming of the gusset in the material withdrawn from the mill roll can be varied as to the relative time and location along the continuous production line, and it may be advantageous to do so closer to the roll.

In the operation illustrated in FIG. 2D, top or cover sheet 284 is heat-sealed around its margins to the edge of gusset panel 216 and along its opposing side peripheries 286 and 288 to the respective edges of the gusset panel and the thermoformed bottom web 202. The package is also heat-sealed along the line 230 as was explained in conjunction with the assembly of FIG. 1, and specifically FIG. 1C, to define the container portion and dispensing tube portion.

In the embodiment in which the package is to be provided with the extended internal straw, the top cover 284 is also heat-sealed to a corresponding raised surface indicated by the dotted line 232 in FIG. 2D, which terminates above the gusset and provides fluid communication between the contents of the container portion and the base of the straw and thereby to the external dispensing tube. A more detailed description of this embodiment is provided below.

In the final step illustrated in FIG. 2E, the portion 250 outside of the container and dispensing tube is die cut and removed, and the exterior end of the dispensing tube or straw 236 is heat-sealed to provide the finished package 240.

In an embodiment illustrated in FIG. 3, as will first be generally described, three separate sheets or webs are employed to form the flexible dispensing package of the invention. The package is formed from a first sheet or bottom sheet having a first dimension. A second or top sheet is disposed in opposing relation to the first sheet and has a second thickness. The first sheet has one or more deformed portions produced during thermoforming that are of a third thickness that is less than the first thickness and may be less than the second thickness. A third sheet is introduced, in a folded form, at one end of the partly formed package to form a gusset made from an independent third sheet which is preferably unwound from a mill roll placed over the bed of the horizontal thermoform-fill-seal machine and its side edge is first sealed to the outside edge of the bottom sheet. As the film indexes in the machine direction, the third sheet is folded to produce a gusset; thereafter, the second or top sheet is positioned and sealed to the remaining edge of the third sheet, forming the finished bottom gusset.

Referring specifically to FIG. 3A, a thermoformed bottom sheet 302 passes to an assembly station illustrated in FIG. 3B where a section 374 of a web contained on roll 370 is dispensed and conveniently positioned to form the gusset flap and separated along line 372 from the roll 370. As shown in FIG. 3C, the transverse edge 378 of sheet 374 is heat-sealed to the corresponding bottom edge of thermoformed member 302 and pleated at line 375 as was described above and folded into a superposed position above the end of bottom sheet 302. Alternatively, after filling of the thermoformed bottom sheet 302, the gusset sheet or flap 374 is positioned and folded, and the cover sheet 384 is positioned and the seals are completed as described above.

In the next step of the method as schematically illustrated in FIG. 3D, the sub-assembly is overlaid with a top or cover web drawn from roll 380 supported on mandrel 381 and sheet 384 is superposed and separated from the web 380 along transverse line 382. Thereafter, the remaining steps of filling and die-cutting shown in FIG. 3E and the final product 340 in FIG. 3F are generally the same as described above in conjunction with FIGS. 2D and 2E. Alternatively, filling can be done after thermoforming and before lidding in order to maximize efficiency of the overall operation.

Referring now to the embodiment of FIG. 4 and the series of assembly steps schematically illustrated in FIGS. 4A-4E, two separate webs or sheets optionally of different thickness are employed to produce the package of the invention. The container portion is formed from a first or bottom sheet that indexes along the work stations of a horizontal thermoform-fill-seal machine. In the stepwise process, the thermoformed container portion is filled before the top sheet is brought into position. As will be understood by one of ordinary skill in the art, the bottom or first sheet can be part of a continuous web from which the completed package is separated as part of the final die-cutting steps. A single unit is shown for convenience here and elsewhere in these drawings.

The top sheet is preferably part of a web drawn from a roll, the sheet being of a width corresponding to that of the container portion and of a length as separated from the web that includes a flap portion that is sufficient to form the desired gusset portion of the package. As the top sheet is brought into position over the bottom sheet, an accessory device folds the flap portion into a V-shape that becomes the bottom gusset of the package. In the next step, the top sheet, which is preferably of a second thickness, which in an embodiment can be less that the first sheet, is positioned in superposed relation to the first sheet and the free end of the folded gusset extension is heat-sealed to the bottom sheet and the fully-formed and sealed gusset and integral top sheet are heat-sealed and the package is completed as described above, e.g., in connection with FIG. 2.

Referring now specifically to FIG. 4A, the thermoformed bottom sheet 402 including container recess 426 is illustrated. As shown in FIG. 4B, a rolled web 480 supported on mandrel 481 is positioned above the assembly station in order to position a second or top sheet 484 above thermoformed bottom web 402 with the gusset flap 406 folded into a position over the preformed web 402 in contact with the exposed surface 416. Although for convenience and the purpose of this illustration, sheet 484 has been severed from web 480 along a transverse line 482 which corresponds to the bottom edge of thermoformed web 402, it will be understood that in a conventional commercial process web section 484 will not be severed until the final die-cutting of the package.

Referring to FIG. 4C, the partial assembly is shown with the gusset portion 406 heat-sealed to the lower edge of bottom sheet 402 along line 410. Combined gusset and cover sheet 484 is brought into superposed position above bottom sheet 402 for heat sealing.

In the assembly operation illustrated in FIG. 4D, top or cover sheet 484 is heat-sealed around its margins to the edge of gusset panel 416 and along its opposing side peripheries 486 and 488 to the respective edges of the gusset panel and the thermoformed bottom web 402. The package is also heat-sealed along the line 430 as was explained in conjunction with the assembly of FIG. 1, and specifically FIG. 1C, to define the container portion and dispensing tube portion.

In the embodiment in which the package is provided with the internal extension defining a straw, the top cover sheet 484 is also heat-sealed to a corresponding raised surface of a heat-sealable elongated region identified by the dotted line 432 which terminates above the gusset and provides fluid communication between the contents of the container portion and the open end of the internal extension and thereby to the external dispensing tube. In an embodiment shown in FIG. 5G where the dispensing tube 136 is more centrally positioned between the edges or side walls of the container portion (not shown), two parallel heat seals defining the elongated regions corresponding to 132 are formed.

In the final step illustrated in FIG. 4E, the portion 450 outside of the container and dispensing tube is die cut and removed to provide the finished package 440.

The improved package of the invention can also be manufactured initially utilizing a web that does not include a thermoformed sheet, where the web is first subjected to several folding steps to provide the gusset, and then to the thermoforming step, which optionally includes providing the internal extension straw, on the thermoforming horizontal form till-seal machine. This method of providing a gusseted thermoformed package having the same finished configuration as those described above is schematically illustrated in the series of FIG. 5A to 5C. In the method of this embodiment, a web 584 is contained on roll 580 supported for easy rotation on mandrel 581. As the web 584 is removed from the roll 580, it passes through a pair of vertical pinch bars or rollers 590 which transition and realign the lateral edge portions 585 of the web into vertical side sections 582 along fold lines 510 and 512. Optionally, internal retaining members (not shown), or other means that are well known to those of ordinary skill in the package forming art provide the restraints to form a sharp inside corner fold, also known as a "dead fold". A plow 560 contacts the bottom portion 506 which defines the gusset panel and lifts it into a folded position 514 between the side panels 502 and 504. Once formed, the leading section is separated from the web along line 520, following which the folded sheet has assumed the same configuration as that illustrated in the series of FIG. 1, and it is passed to a thermoforming station (not shown) where panel 502 is heated and thermoformed, and optionally filled. Thereafter, completion of the sealed fluid-tight package of FIGS. 5B and 5C is as described in conjunction with FIGS. 1B, 1C and 1D.

Once completely formed, filled and sealed, the finished package is then die-cut in order to produce the flexible package with integral dispensing tube and gusseted bottom that results in the improved self-supporting stand-up configuration. The die-cutting can be completed as part of the continuous operation on the forming and filling machine, or each unit can be separated after the final heat-sealing step, stacked and processed on a separate die-cutting machine. It is to be understood that the dispensing package of the invention can be produced without the gusset formed, in which case the flat cover sheet will be heat-sealed to the periphery of the bottom sheet.

In another preferred embodiment, which can be used with any of the variations described above, the package is heat-sealed with the straw-like internal extension of the dispensing tube that has an opening proximate the bottom gusseted interior portion of the package.

A compartment is thereby defined within the perimeter and between the folded, gusseted sections of the sheet. In the embodiment illustrated, the container portion is generally rectilinear. A rectilinear configuration can advantageously be employed to minimize waste, as is illustrated by the figures and explained in U.S. Pat. No. 8,381,941.

However, as will be apparent to one of ordinary skill in the art, other shapes can be thermoformed, including circular, oval and combinations of curvilinear and rectilinear to provide novel flexible packaging shapes imitating nature's shapes for packages containing apple juice, lemonade and other fruit-flavored beverages. These shapes, particularly when combined with appropriately colored printed designs and labels that are pre-printed and indexed on the polymer webs serve as strong cues to consumers and lead to brand recognition.

The dispensing tube is preferably of a width and a depth that are less than those of container portion, particularly where the flexible package is to be used as a beverage container. One end of the dispensing tube or straw terminates proximate the bottom of the interior of the container portion. The opposite end of the flexible dispensing tube or straw is sealed during manufacture to secure the liquid contents in the transport configuration.

As will be understood by those of ordinary skill in the packaging art, there are various types of filling methods and apparatus that can readily be adapted for use in filling the packages of the invention. The choice will be based upon the type of liquid and/or the viscosity of flowable material that is to be placed in the container portion of the package. When a Horizontal Thermo-Form Fill Seal type of HFFS apparatus is used, it is efficient to fill the thermoformed container portion in the horizontal position as the formed unit moves from one station to the next. A readily flowable, low viscosity liquid such as beverage can advantageously be dispensed from the beverage reservoir by gravity flow with the fill tube positioned in close proximity to the open container portion. Obviously, flow rates must be controlled to prevent splashing of the material onto the margins of the thermoformed portion that are to be heat-sealed in a subsequent step.

As noted above, in one embodiment, the flexible package is formed with the external end of the dispensing tube open, and the container portion can be filled by an elongated filling nozzle or tube that is inserted into the dispensing tube to inject a predetermined volume of liquid into the container portion. Thereafter, the filling tube is withdrawn and the end of the tube is heat-sealed to secure the contents.

Other types of filling apparatus include piston, auger, centrifugal and volumetric filling devices. For more viscous materials such as heavy oils and greases, air or hydraulic pressure can be applied to meet the filling-time requirements of the automated apparatus.

Multiple filling nozzles can also be employed for rapid introduction of the contents into containers having a relatively large volume. Substances subject to splashing can be introduced into the container portion using a bottom-up filling method where the filling nozzle is raised and maintained at a position just above the surface of the rising material as the material fills the container portion of the bottom thermoformed sheet.

In one preferred embodiment of the package of the invention, the free end of the dispensing tube is folded to contact the container portion of the package, thereby providing a more compact configuration, e.g., for placement in shipping boxes and for retail shelving. A low-tack or releasable food-grade adhesive, or a piece of releasable or repositionable pressure sensitive tape, or a band can be used to temporarily secure the folded dispensing tube in position.

In the dispensing configuration, the end of the exterior portion of the integral tube defines an opening such that the liquid, e.g., beverage or other flowable substance contained in the package can be withdrawn or dispensed from the container portion. In accordance with a further embodiment, the end of the integral flexible tube includes one or more tear notches proximate the sealed portion to facilitate the removal of the sealed free end of the dispensing tube to provide the opening through which the liquid can be withdrawn, as by sipping, or discharged under pressure, as by manually squeezing the container portion. If the contents are a beverage, the integral tube functions as a straw.

As an alternative, or in addition to providing one or more tear notches to facilitate the removal of the end of the dispensing tube, and to assure ease of opening by the user, the flexible packaging material can be laser scored. Laser scoring assures the precision separation of the tip by controlled score depth that maintains the integrity of the flexible polymeric material. Automated computer-controlled equipment for the laser scoring of flexible packaging materials is commercially available from numerous sources, including LASX Industries, Inc. of St. Paul, Minn., www.lasx.com; LaserSharp FlexPak Services, LLC Vadnais Heights, Minn.; and Preco, Inc., Lenexa, Kans.

For certain specialized applications, the length of the flexible dispensing tube can be increased so that its free end is positionable independently of the container portion, and the viscous substance that exits the package via the opening can be deposited at multiple, spaced-apart target locations without moving the compartment, should that be desirable in specific commercial or industrial applications.

The dimensions of the package will determined by the desired volumetric content. A suitable and convenient single-serve package size for ease of handling can be of a width of about 3 inches and a height of about 4 inches with an average depth of about one to 1.5 inches. For single-serve packages containing beverages that are intended to be consumed by the internal extension of the dispensing tube, it may be desirable to underfill the package by providing a larger maximum volumetric capacity than required in order to avoid unintentional discharge upon removing the sealed end portion of the dispensing tube if the package is inadvertently squeezed by the user. In order to minimize the unintentional discharge of, e.g., a beverage from the package, the cross-sectional area of the dispensing tube can be reduced at one position, for example, where it joins the container portion. Another alternative is to configure the internal extension portion to form a torturous path for the liquid to follow which will serve to reduce the rate of flow for a given internal pressure on the liquid in the container portion. These configurations can also be used in combination. In any case, the restriction(s) can readily be determined so that the beverage can be withdrawn by sipping without undue difficulty, while at the same time, reducing the likelihood of an unintentional discharge through the tube.

As will be apparent from the above description and the methods schematically illustrated in the figures, there are many options for both apparatus and methods that are known in the art that can readily be adapted for the production of the packages of the present invention. The improvements directed to the internal extension of the dispensing tribe and to the gusseted flexible thermoformed package with or without the internal extension of the dispensing tube can be mass produced economically using a variety of methods and apparatus known to those of ordinary skill in the art.

A thermoforming die suitable for forming an embodiment of the invention is illustrated in FIG. 6. The die 600 includes a container portion 604, a dispensing tube portion 614 and a peripheral portion 608 where the polymeric webs from which the package is constituted are heat-sealed. In order to produce the internal extension, or straw, that is in fluid communication with the dispensing tube, an extension wall 620 is positioned, e.g., generally parallel to the outer sidewall 602 of the die 600 and extends towards base wall 612, but terminates to permit fluid flow into the open region at the end defined by the wall 620 and the adjacent side wall of the container portion 604.

In the embodiment shown in FIG. 6, the extension wall 620 has leading edge 628 which is curved toward the bottom of the container portion in order to facilitate the thermoforming of the bottom web during the heating and vacuuming-forming step.

The relative position of extension wall 620 is best shown with reference to FIG. 6A which is taken along FIG. 6 section line A-A, and FIG. 6B which is taken along section line B-B. A portion of the upper surface 622 is at the same height as the periphery 608 of the die so that when the top layer of polymer web is put into position for heat-sealing, the side of the dispensing tube 614 is extended toward the bottom of the container portion 604 by contact with the upper heat-sealing element (not shown) in order to form the internal extension. The bottom of the channel is defined by the interior wall 624 of the die which also tapers toward the bottom of the container portion in order to support the bottom of the web on surface 627.

Figure 6D:
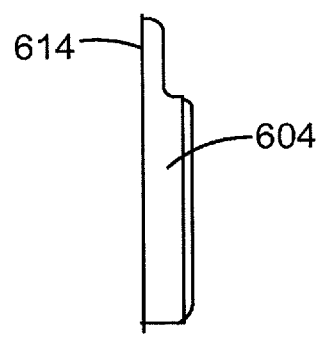
Figure 6E:
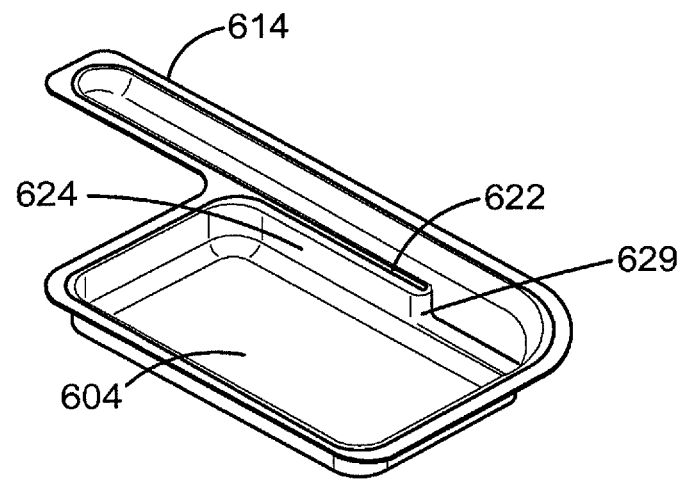
Figure 6F:
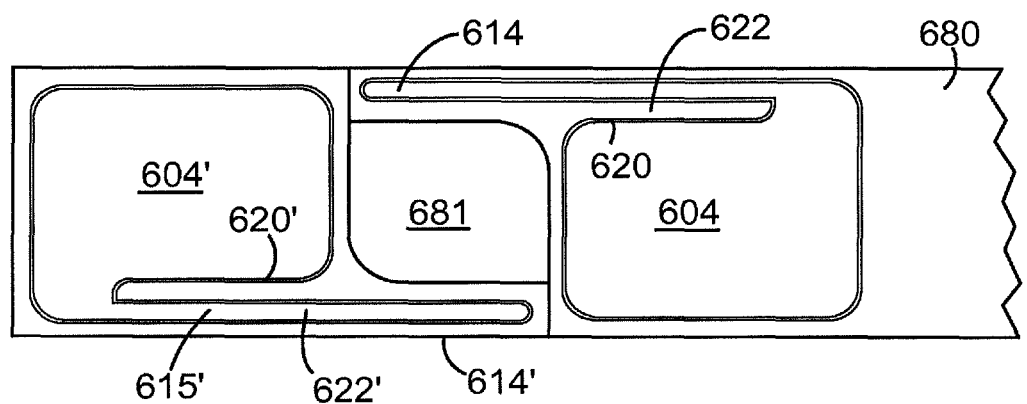

Referring now to the series of illustrations of FIGS. 6C, 6D and 6E, there is shown another embodiment of the present invention in which the extension wall 620 is substantially rectangular and the leading edge 629 is normal to the top surface 622, as best shown in FIGS. 6C and 6E. As shown in the bottom view of FIG. 6D, the dispensing tube 614 is less than about one-half of the depth of the container portion 604 and is formed with a curvilinear termination at 629.

As will be apparent to one of ordinary skill in the art from this description, the position of the extension wall 620 and its relation to the container portion 604 can be varied within the contemplation of the present invention. For example, referring to the configuration depicted in the illustration of FIG. 6F, the dispensing tube 614' and its contiguous extension 615' can be displaced from the container portion 604 by positioning wall 622' parallel to and adjacent base wall segment 605" of the container. It is also noted in the illustration of FIG. 6F that the pair of dispensing containers are positioned in a nested configuration on a section of the web 680 and that the central region 681 is the waste remaining after the two packages are die-cut from the web 680.

Figure 6G:
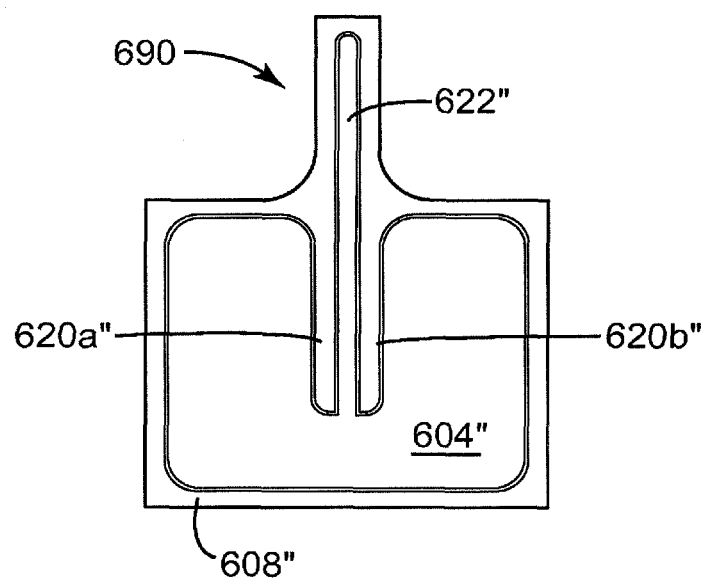

Referring to FIG. 6G, there is schematically illustrated a die that is configured for the thermoforming of the bottom sheet to produce a flexible dispensing package having the dispensing tube positioned intermediate the side walls of the container portion 604". The dispensing channel 622" which extends into the chamber of the container portion is defined by opposing walls 620a", 620b" to than the internal extension of the dispensing tube, the end of which terminates in spaced relation to base wall 608".

As will be understood by one of ordinary skill in the art, the thermoforming dies are heated and in communication with a vacuum pump that serves to draw the pre-heated bottom web into position to assume the internal contours of the die. The thermoforming step can optionally facilitated by the use of a second plug-assist member (not shown) which contacts the web from above to assure that the bottom sheet assumes the desired contour as defined by the die.

Figure 7:
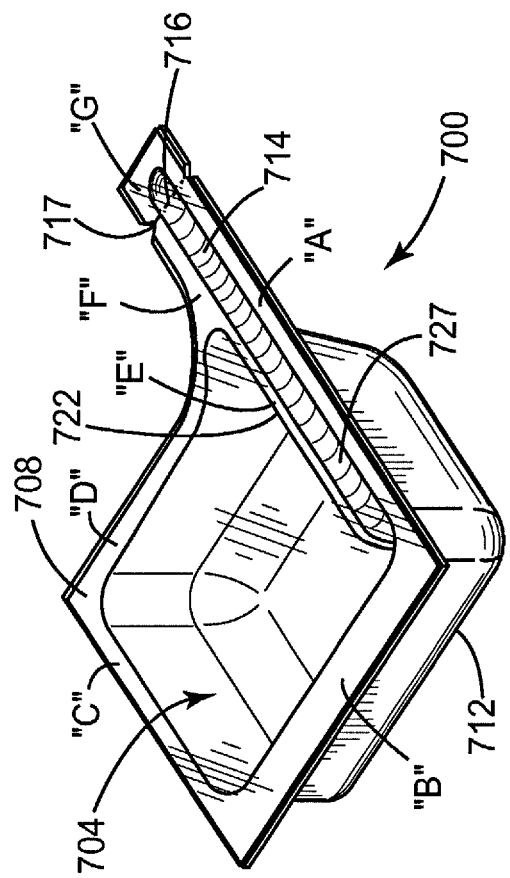
FIG. 7 is a perspective view of the flexible dispensing package with a dispensing tube extension into the lower interior portion of the container portion.

Referring now to FIG. 7, there is illustrated the straw-like internal extension of the dispensing tube that is produced by thermoforming a bottom web or sheet on the die of FIG. 6. The finished package 700 will have six seals on its periphery 708, identified as "A" through "G" where E is the extension portion from the interior base of the dispensing tube into the interior of the container portion of the package. The sealed end of the dispensing tube at G is provided with at least one, and preferably a pair of opposing notches 717 joined by a weakened parting line 716, to facilitate removal of the sealed end for dispensing. The internal extension, or straw 727, can project into the container portion 704 of the package 700 to any desired depth, so long as the sealing line 722 doesn't connect with seal "B" and remains spaced from base wall 712 to permit the desired fluid flow. As long as seal "E" terminates at a location that is displaced from seal "B", it will act as a straw allowing the user to sip substantially all of the beverage from the container portion through dispensing channel 714. As will be apparent, squeezing the flexible container portion will also facilitate complete removal of even a viscous product from the package.

In order to provide the dispensing tube with resistance to restrictive deformation and/or flattening when a liquid beverage is withdrawn by sipping, the dispensing tube portion of the thermoforming die can optionally be provided with a series of spaced-apart longitudinal ridges that produce a fluted or pleated configuration in the finished thermoformed sheet. A corresponding fluted or pleated configuration is optionally formed in the corresponding opposing section of the top sheet or web prior to the two sections being heat-sealed together.

Figure 8:
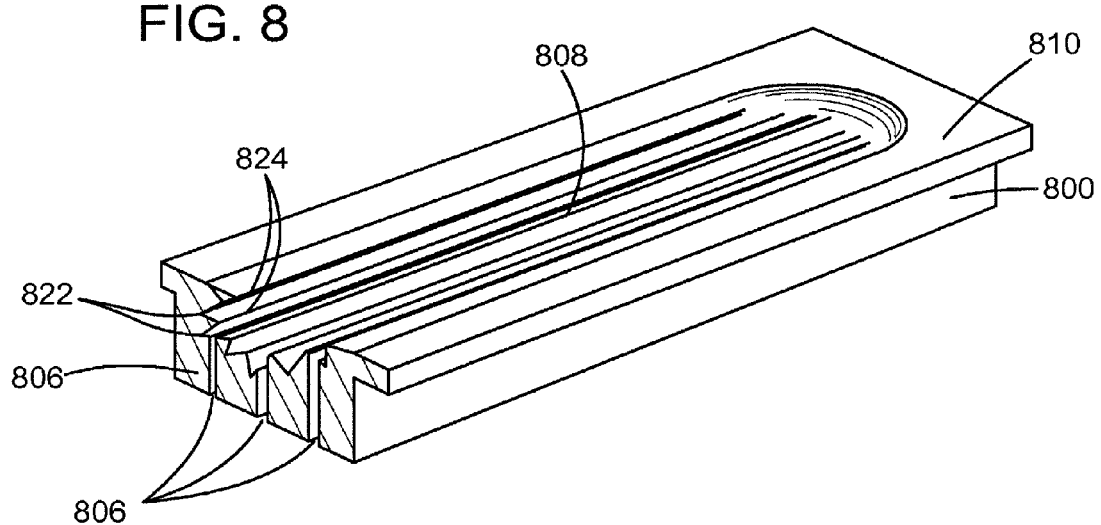
FIG. 8 is a perspective view, partly in cross-section, of a portion of a die or mold used to produce a pleated configuration in a thermoformed dispensing tube in accordance with the present invention.

Reference is made to FIG. 8 which represents a partial cross-sectional view of a portion of the thermoforming die 800 that illustrates one configuration of a sharply fluted surface used to produce longitudinal pleats in the thermoformed dispensing tube. The portion of the die 800 shown in cross-section receives the bottom web or sheet (not shown) which comprises the external flexible dispensing tube portion of the package. The cross-sectional surface 802 passes through a plurality of relatively small orifices 806 which are in fluid communication with a low pressure pump or chamber which is used to apply a vacuum to the interior of the die 800 in order to draw the heated and softened bottom sheet into contact with the interior surface of the die 800. The recessed portion 808 forms a portion of the flexible dispensing tube. The outer surface 810 provides the area on which the bottom thermoformed sheet rests during the heat sealing step.

As illustrated in FIG. 8, the interior surface is contoured with a plurality of generally parallel longitudinal flutes in the form of sharply defined peaks 824 and valleys 822 having flat sides. As will be understood by one of ordinary skill in the art, the finished thermoformed polymeric portion of the web will have a corresponding contour that will provide a pleated surface having resistance to collapsing under the effect of a low pressure created by sipping the beverage from the container. This configuration can provide sufficient resistance to collapsing when the top sheet is heat-sealed in a flat configuration, i.e., without pleats, across the opening of recess 808.

Figure 8A:
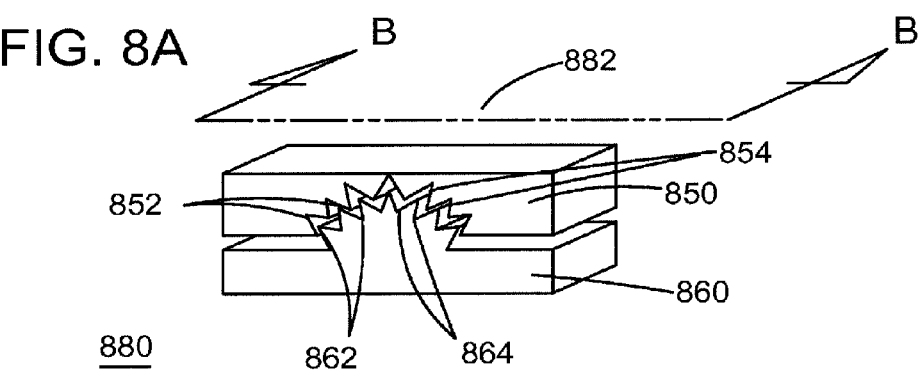
FIG. 8A is a schematic illustration of a pair of dies used to produce longitudinal pleats in a portion of a polymeric web that is used to produce a package in accordance with the present invention.
Figure 8B:
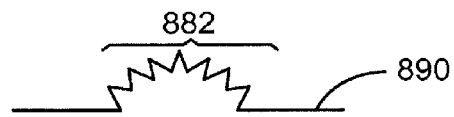
FIG. 8B is a cross-sectional view of a pleated web produced by the die set of FIG. 8A.

In another embodiment illustrated in FIG. 8A, the portion of the top sheet 880 is passed through a pair of close-fitting dies 850, 860. In the central portion, these dies have sharply fluted peaks and valleys that receive a portion of the web corresponding to the dispensing tube and produce a set of pleats 882 which are registered during assembly of the top sheet to the thermoformed bottom sheet. The resulting pleated top sheet 882 is illustrated in the cross-sectional view of FIG. 8B taken along section line B of FIG. 8A.

The ridges 862 in die element 860 correspond to the valleys 852 in upper die 850. Likewise, the valleys 864 in lower die element 860 correspond to the peaks 854 in upper die element 850. The spacing between the upper and lower dies 850, 860 are determined by routine experimentation as required to produce the desired degree of longitudinal pleating in the web 880. The optimum temperature of the dies is likewise determined by routine experimentation and will depend upon the gauge, type and rate of movement of the web through the die opening.

Suitable materials that can be used as the thermoforming web and/or the lidding web that have the ability to be permanently formed, either thermoformed or by folding into the flutes or pleats to provide a more rigid structure that will resist collapsing include the following:

formable aluminum foil, with or without a polymeric coating or laminated;
PCTFE, a fluoro polyester sold by DuPont under the trademark ACLAR;
cyclic olefin copolymers;
polystyrene;
co-polyesters;
GPET, an amorphous polyester; and
LPDA, an unplasticized PDC.

Some, of these materials are relatively more costly than conventional packaging polymers, and the aluminum foil has a relatively shallow depth of draw, but all have the desired property of maintaining a dead fold.

As was stated above in connection with the description of the series of FIG. 1, the polymeric packaging material can be provided with appropriate graphics prior to its assembly into the finished package of the invention. The web of material is unwound from its original roll, printed and then rewound onto a second roll for placement on the automated package forming equipment. One or a combination of printing processes such as lithography, flexography, process flexography, rotogravure, off-set and silk screening are well known in the packaging industry.

Figure 9A:
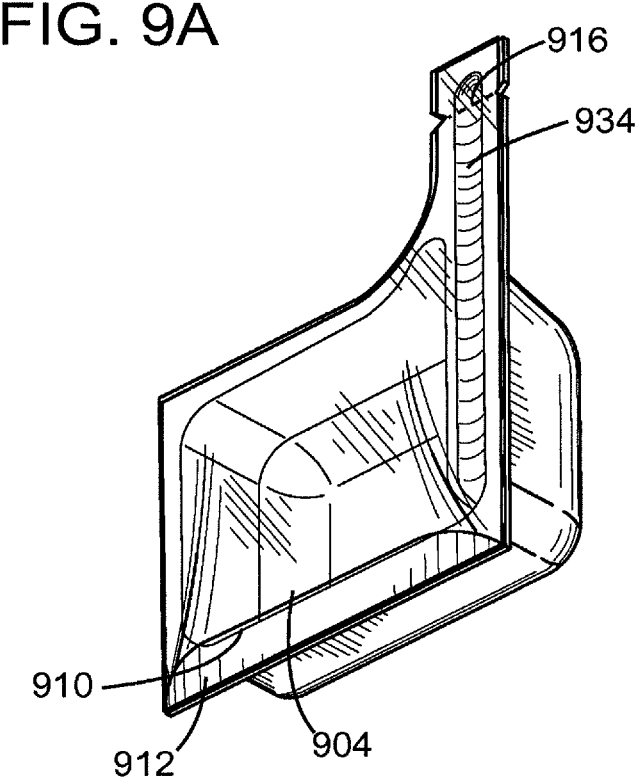
FIG. 9A is a perspective view of a flexible thermoformed package with a bottom gusset.
Figure 9B:
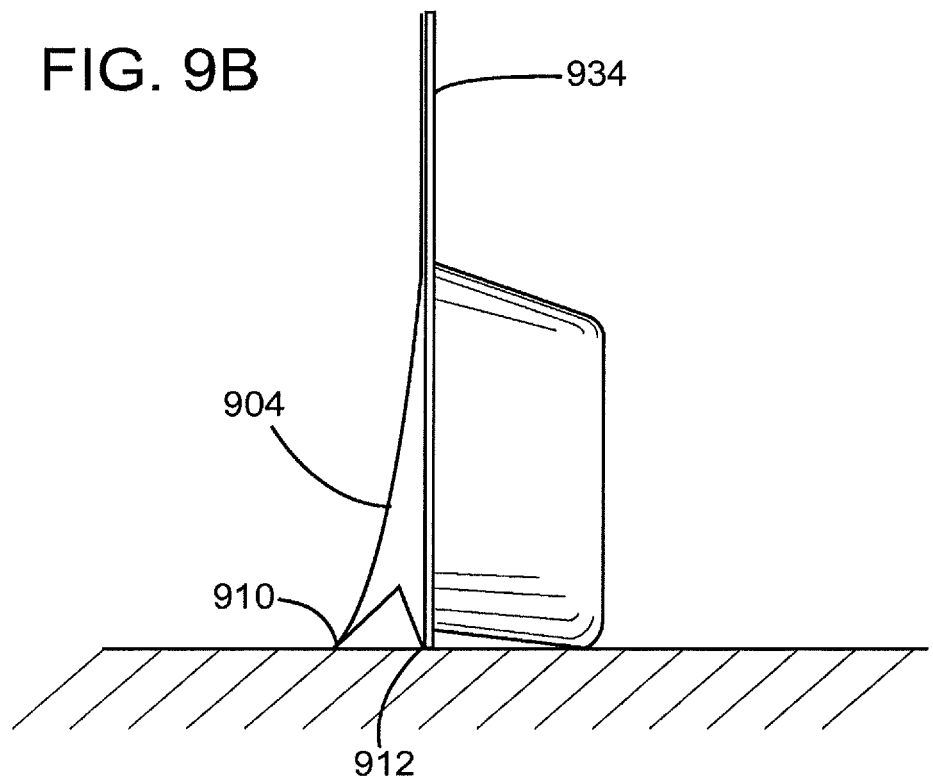
FIG. 9B is a side elevation view of the gusseted package of FIG. 9A.

The optionally gusseted thermoformed flexible package with dispensing tube of the present invention is illustrated in FIGS. 9A and 9B. When the package is filled and the gusset 906 is expanded, the package can assume a stand-up configuration for shelf display with the printed cover sheet 804 in the vertical position and the dispensing tube 934 at the top, as shown in FIG. 9B. As previously described, heat-sealing of the periphery of the fold lines 910, 912 provides further rigidity at the perimeter of the gusset, rendering the package more stable when shelved or in use. If the internal extension of the dispensing tube is to be funned in the gusseted package, the dispensing tube is preferably aligned with a side margin of the package, rather than being positioned centrally. This allows the heat-seal along the front or top sheet of the package to he positioned proximate the edge, thereby minimizing the effect on the expansion of the gusset. The length of the internal extension can also be adjusted to achieve the desired degree of expansion of the gusset.

As illustrated in FIG. 10, a further embodiment of the flexible beverage pack 1000 with a dispensing tube 1014, includes a length of preformed plastic drinking straw 1040 that is positioned between the thermoformed bottom sheet 1004 and the cover or lidding sheet 1027. The length of the straw 1040 is predetermined to extend from a position close to the base of the finished thermoformed container portion 1004 and to terminate adjacent the portion of the dispensing tube 1052 that will be removed to provide access to the contents. The placement of the straw occurs after the bottom sheet has been vacuum-formed in the die and the channel defining the dispensing tube has been formed. This additional step can also be automated and accomplished on the automated horizontal thermoforming-fill-seal machine. The longitudinal upper surface of the straw is preferably at the same level as the peripheral heat-sealing surfaces 1008 of the die so that the top sheet 1027 contacts it and secures the straw in position for use.

The open end 1042 of the straw 1040 is displaced from the end wall 1012 of the container portion that is opposite in order to minimize the risk that the interior open end will he inadvertently sealed by contact with the flexible container during use.

Straws of any known construction can be used in this aspect of the invention, including plasticized spiral-wrapped paper or other treated paper, or extruded plastic. The gauge and strength of the material from which the straw is fabricated is selected based upon its ability to withstand the foreseeable forces of deformation that occur during packaging, handling and use. Flexible or corrugated straws which can be bent 180° while maintaining an open passage can advantageously be used to permit the dispensing tube and internal straw to be folded into a more compact configuration fir shipping and shelf display.

The end 1042 of the separate semi-rigid straw 1040 that is positioned in the container portion of the package can be cut on a bias 1043 as illustrated in FIG. 10A so that it is not readily closed by temporary contact with the interior wall of the container during sipping. In another embodiment illustrated in FIG. 10B, the end of the straw positioned in the container portion is provided with a plurality of relatively small openings 1044 extending through the sidewall of the straw proximate the end. In the event that the adjacent flexible package wall does come into temporary sealing contact with the bottom of the straw, the liquid contents will pass through the openings when the straw is sipped.

As also illustrated in FIG. 10, the end 1042 of the straw 1040 is displaced inwardly from the cavity or channel formed in the dispensing tube 1014 and the top sheet or lidding 1027 is provided with a preformed hole 1030 that is aligned with the region between the end of the straw and the closed end of the dispensing tube channel. The opening 1030 is preferably sealed with a peelable pull tab 1050. The tab is comprised of an adhesive-backed portion 1052 and a free portion 1054 that can be gripped by the user between the thumb and forefinger to strip the pull tab from the top sheet and thereby expose the opening 1030 for access to the beverage by sipping the straw through the outer packaging. Alternatively, the upper end of the dispensing tube can be removed along a separation line defined by the notches and/or laser scoring of the flexible packaging to expose the end of the straw 1040 for sipping by the user.

For applications other than single-serve beverage containers, the peelable access tab can be resealable by selection of appropriate adhesives that are well known in the art. In industrial and commercial applications in which the entire contents may not be required, e.g., a lubricating oil, the opening can be resealed by the tab.

Also as previously noted, specialized packaging configurations that are representative of the source and/or nature of the liquid product in the container can be accentuated by the graphic design printed on the webs used to form the package. Choice of colors and representations of fruits such as apples, oranges and tomatoes applied to round or curvilinear packages containing their juices will achieve rapid consumer recognition.

The configuration of the package can also include positioning of the dispensing tube away from the side margin and at, or towards a central position. For packages containing fruit flavored beverages, a more central placement of the dispensing tube and appropriate printing would mimic the stem of the fruit. This configuration of the dispensing tube relative to the container portion is particularly effective in the embodiment in which the package contains a gusset which will serve to provide a more rounded configuration to the principal display panel.

In the interest of economy, the principal display panel of the package which is visible to the consumer on the shelf of a retail establishment can be printed as desired and the rear or remaining portion of the package left unprinted. This may be of particular interest for industrial products such as lubricating oils and the like, or for liquids that are packaged and placed in containers with cake mixes or other partially-prepared foods in which a number of ingredients are included in a box or package that is appropriately labeled. The gusset of the package can also remain unprinted so that the contents are visible through an optionally transparent base.

Figure 11:
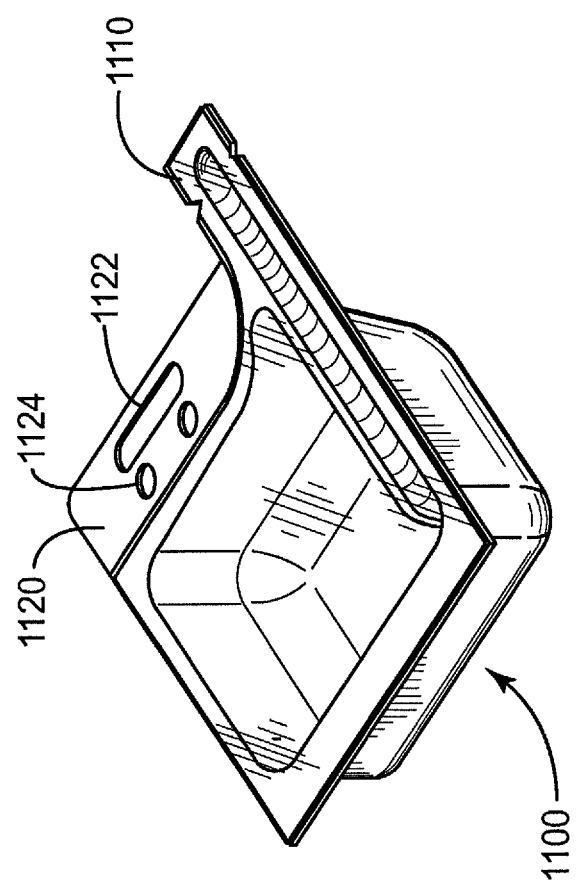
FIG. 11 illustrates an embodiment of the invention that is configured for placement on a retail sales display rack.

Referring now to the embodiment of the present invention illustrated in FIG. 11, the improved package 1100 can be produced with a wide seal 1120 at the top adjacent the dispensing tube 1110 in which sealed area one or more openings 1122, 1124 are formed that are configured and dimensioned to receive a conventional horizontal support of the type commonly used at retail establishments to display packaged snacks and the like. The openings can be die-cut, punched or produced by heat deformation. The reinforced openings 1122, 1124 permit display of the package for sale without taking up valuable shelf space and allows placement at the check-out station, e.g., at convenience stores, to encourage impulse purchases.

Figure 12A:
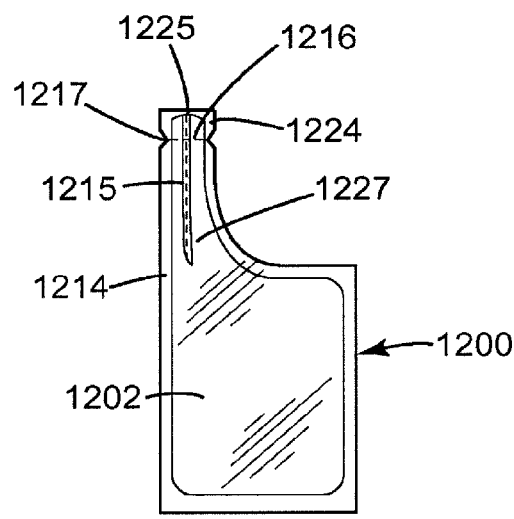
FIGS. 12A and 12B are simplified schematic front elevation views of a dispensing package of the invention in which the dispensing tube includes a longitudinal seal and perforation line dividing the free end into two channels.
Figure 12B:
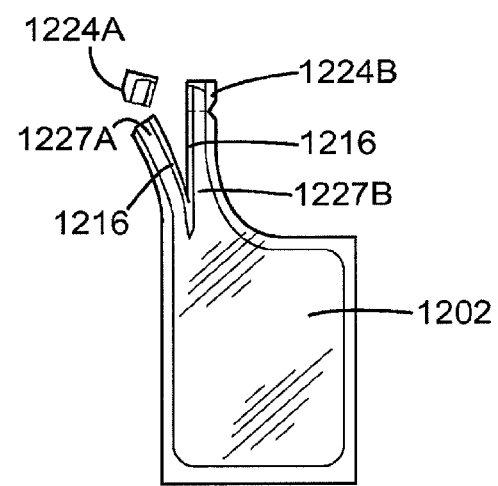

Retelling now to FIGS. 12A and 12B, there is illustrated a general construction 1200 of a flexible package with the integral dispensing tube of the invention, in which the dispensing tube 1214 includes a centrally positioned heat-sealed portion 1215 extending from above the transverse weakened tear line 1216, e.g., a laser score line, which terminates in opposing notches 1217 and extends into the open channel 1227 of the dispensing tube 1214. As can be seen, the longitudinal weakened parting line 1225 divides the dispensing channel 1227 into adjacent channels, both of which are in fluid communication with the contents of container portion 1202. The dispensing tube also includes a removable sealing portion 1224.

As shown in FIG. 12B, the removable sealing portion 1224 defined by transverse weakened tear line 1218, e.g., illustrated as a line of perforations, is divided into sections 1224A and 1224B by longitudinal perforation line 1225. When divided, the dispensing tube remains sealed by areas 1216 on either side of line 1225. This permits one of the adjacent channels in the dispensing tube to be opened, e.g., by removing section 1224A, while leaving the adjacent channel sealed by 1224B. The channels 1227A and 1227B can be separated to the degree desired by further tearing along longitudinal perforation line 1225. This construction permits the user to control the volume of the fluid dispensed, depending upon the specific need. More than two dispensing channels can be created using this construction and each channel can be the same or a different size, as determined by the configuration of the adjacent heat-sealed portion(s). The length of each of the two or more dispensing channels can also be different.

Figure 13A:
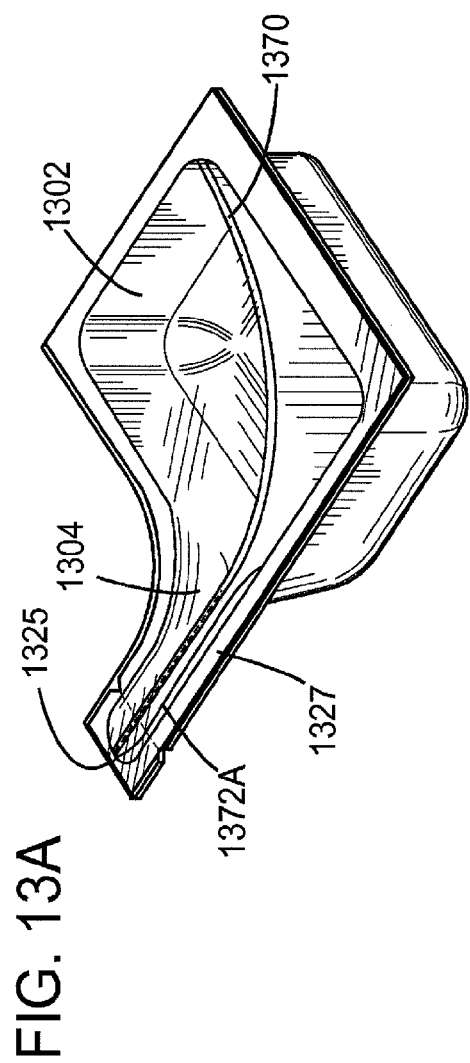
FIG. 13A is a perspective view of a dispensing package of the invention which includes a dividing wall extending from the sealed end of the dispensing tube to an interior wall of the container portion and lines of longitudinal perforations to thereby form two dispensing channels and product compartments.
Figure 13C:
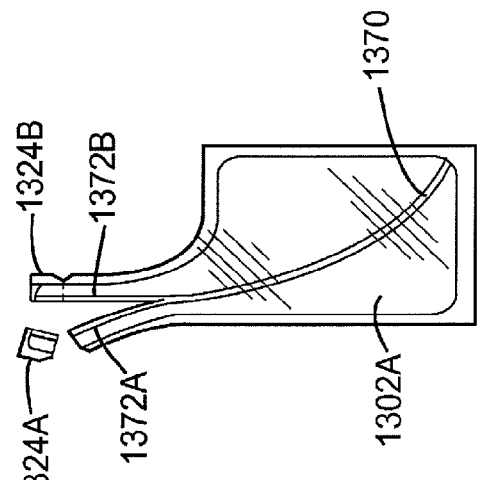
FIG. 13C illustrates the separation of the dispensing channels of the package of FIG. 13A, with the sealed end portion removed from the left channel in preparation for dispensing contents from the left compartment.
Figure 13B:
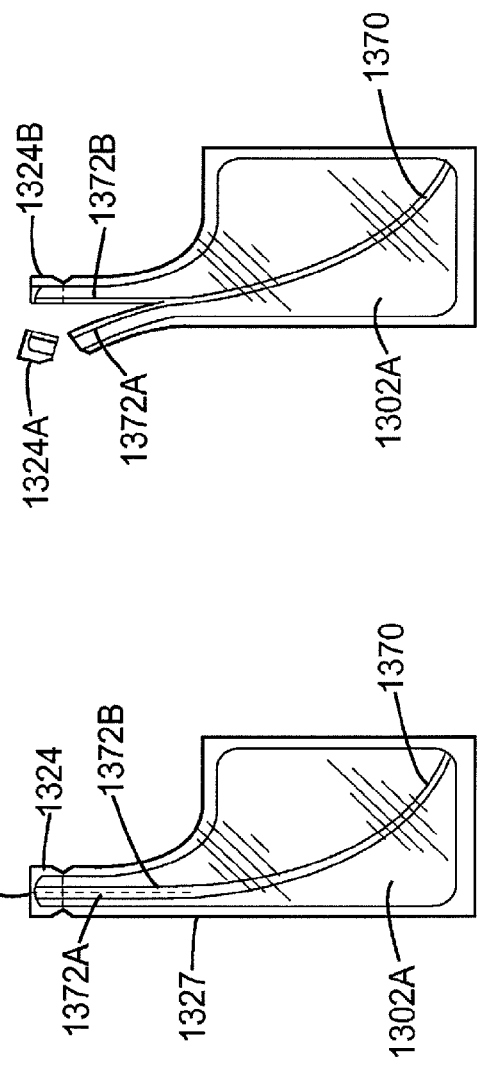
FIG. 13B is a simplified front elevation view of the dispensing package of FIG. 13A.

In another embodiment of the invention illustrated generally in FIGS. 13A-13C, an interior partition or wall 1370 extends from the exterior of the sealed end of the dispensing tube 1314 through the container portion 1302 to meet the base or sidewall, or their juncture, opposite the dispensing tube to divide the container 1302 into two separate portions 1302A, 1302B, where the height of the interior dividing wall 1370 is sufficient to make contact during heat sealing of the upper web 1304, and is preferably the same height as the sealing rim 1308 that extends around the periphery of the package.

In a particularly preferred embodiment as illustrated in FIG. 13A, the portion of the dividing wall 1370 which lies within the dispensing tube portion 1314 is formed as two parallel, spaced-apart walls 1372A, 1372B. When the upper web 1304 is heat-sealed to form the fluid-tight package, a line of perforations are provided between the two wall sections 1325 and terminates at a location where the solid portion of the wall 1370 begins.

Referring now to FIG. 13B, it will be seen that the upper sealing portion 1324 of the dispensing tube is divided by a transverse weakened separation line 1318 and also by the longitudinal perforation line 1325 that extends down the dispensing tube towards the container portion 1302. In the embodiment shown, the fluid-tight dividing wall 1370 terminates at the intersection of the bottom and sidewall defining the container 1302 that is diagonally opposite from the internal end of the dispensing tube. Other configurations and locations of the wall 1370 can be selected based upon the particular use for which the flexible package is intended. For example, the two independent container sections 1302A and 1302B can be proportioned to dispense predetermined volumes of a flowable material such as an epoxy resin and its hardener that are to be mixed in a ratio of 2-to-1. Desired proportions of oil and vinegar can be dispensed by placement of the dividing wall to provide that volumetric ratio. Other alternative uses are discussed above and still others will be apparent to those of ordinary skill in the art without contacting the adjacent portion of the tube.

Referring to FIG. 13C, the portion 1324A of the sealed end 1324 of the dispensing tube has been split transversely and longitudinally along the parting lines previously described. The portion of the dispensing tube from which the seal has been removed has been further separated along the longitudinal parting line 1325 so that the portion of the dispensing tube 1372A can be used to dispense the contents, or some part thereof from container portion 1302A.

It will be understood from the earlier description of the production of the bottom portion of the package, that dividing wall 1370 is formed by a corresponding projecting element in the die over which the bottom web is placed and, preferably, vacuum-formed and, optionally, including the assistance of a plug assist or male die. As was discussed above and in the cited prior art patent, the thickness or gauge of the bottom polymeric web is selected to account for the stretching, or thinning, as the interior features of the channel in the dispensing tube and the container portion are formed under the effects of heat, vacuum and, optionally, contact with the second die.

Referring now to FIG. 14, there is illustrated a representative package 1400 with an integral flexible dispensing tube or straw 1414 and container portion 1402 that can be configured in accordance with any of the embodiments described above, including those described in U.S. Pat. No. 8,381,941 and U.S. Pat. No. 8,430,266. The series of reference numerals employed corresponds generally to those used in earlier descriptions, e.g., FIG. 1. In the embodiment, the representative package 1400 is provided with a sealed pocket or pouch 1450 that is integrally joined to one or more of the sealed lateral edges of the package. In a preferred embodiment, the pocket portion 1450 is formed at the time of manufacture of the package using one or both of the polymer layers of which the package is constituted. For example, when the thermoformed container and dispensing tube channel are formed, the bottom portion of the polymer web 1402 corresponding to portion 1450 remains after any necessary die cutting to form the desired shape. When the upper polymer web 1402 is superposed for heat sealing, the periphery can be sealed along one or both of the exterior edges 1452 and 1454. The surface 1450 defined by the heat sealing can be manually grasped or gripped by the thumb and fingers during removal of the end of the flexible dispensing tube 1414 at the tear notch so that the contents, e.g., a beverage, are not inadvertently discharged from the open end. The opposing surfaces of portion 1450 can be provided with a textured pipping surface 1455 during the heat-sealing step to increase the frictional effect.

In another embodiment of the invention illustrated in FIG. 14 which is otherwise similar to the package 1200 described above, one or more lines of perforations 1458 or 1459 are provided adjacent the interior edges that define the pocket 1450. For example, lines of perforations 1458A and/or 1458B permit the user to gain access to an object placed in the pocket during manufacture of the combination package. In the instance where intersecting perforation lines 1458A, 1458B are employed, the user can separate the pocket 1450A from the rest of the package for ease of retrieving the article, e.g., a premium, printed matter, a tablet or pill, or the like. Alternatively, a single line of perforations 1459 can be provided along the marginal seal that defines the dispensing tube 1414 and the contiguous container 1402, allowing the user to remove the pocket portion 1450B.

Referring now to the embodiment of FIG. 15, a rectilinear pocket 1560 is integrally formed along and joined to a side of the container portion 1502 of the dispensing package 1500. The size of the pocket 1560 is determined by the particular use or application for which the container portion is intended. For example, if the container is filled with a beverage and is to be sold by a quick serve restaurant, a small toy or other premium can be placed in the pocket 1560 to promote sales to children. Alternatively, a cookie or other snack food can be sealed in the pocket for consumption with the beverage. This form of packaging is convenient for both the seller and the consumer, particularly where the unitary package reduces handling and entering separate items for payment. It can also be used to advantage in introducing customers to small portions of a new product.

The overall package can be configured for conveniently providing ingredients for more basic food preparation, e.g., liquid and dry ingredients, respectively, separably joined by perforations 1562 between the liquid container 1502 and the sealed pocket 1560 provided with perforations 1564 along an edge or across a corner 1566 for a more controlled pouring of the dry ingredient(s).

Figure 17B:
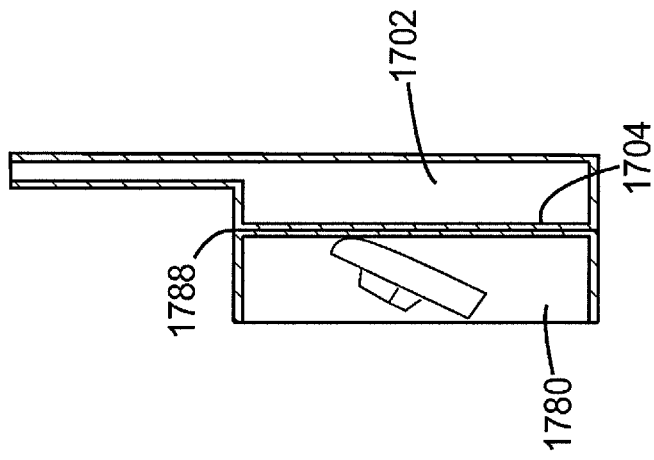
FIGS. 17A and 17B are, respectively, a simplified schematic front and side elevations of a dispensing package integrally joined along an intermediate scored portion to a transparent pocket containing a toy premium which can be folded into a more compact superposed configuration.
Figure 17A:
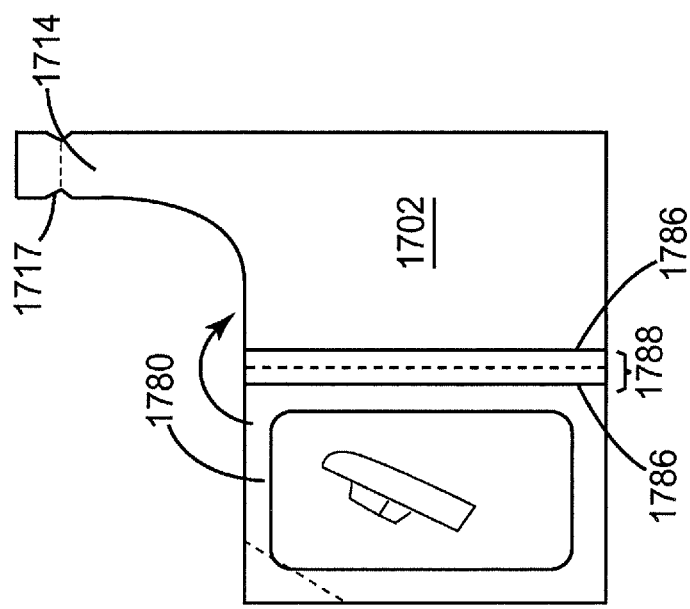

Other embodiments of the flexible package with integral dispensing tube of the invention in combination with a sealed pouch or pocket are illustrated in FIGS. 16, 17A and 17B, the former providing the option of a larger pocket 1670 separably joined along the edge of the flexible dispensing tube 1614 by a line of perforations 1672. The integrity of the pocket can be maintained by heat-scaling the edge portion 1673 adjacent the perforation line 1672. Access to the pocket 1670 can be provided by one or more additional lines of perforations 1674, e.g., adjacent the top edge or 1676 adjacent the lateral edge. As is well known to those in the packaging art, the ease of separating the pocket 1670 from the remainder of the package can be facilitated by the use of slit perforations or by hole perforations such as those used on postage stamps.

As shown in FIG. 17A, the overall package can be dimensioned and configured to permit the pocket 1780, with whatever may be contained therein, including illustratively a toy or other three-dimensional article, to be joined to the container portion 1702 as described in detail in other of the embodiments. As shown in FIG. 17B, the combination can be configured to be folded to overlay the flat rear or front surface of the container portion 1702 and dispensing tube 1714 to form a more compact unit for shipment, display and handling by sales personnel and users alike. This embodiment of the invention in "booklet" form is facilitated by providing fold lines 1786 with an intervening sealed area 1788 that serves the same function as the spine of a book and enables the two portions to be easily superposed. The distance between the fold hues 1786 is determined by the thickness of the article in pocket 1780.

Figure 18A:
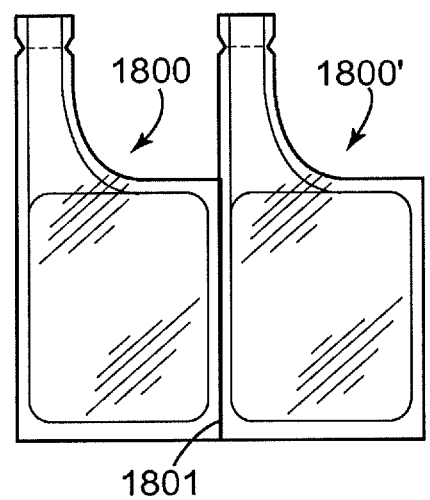
FIG. 18A is a simplified front elevation view illustrating two packages of the invention separably joined.
Figure 18B:
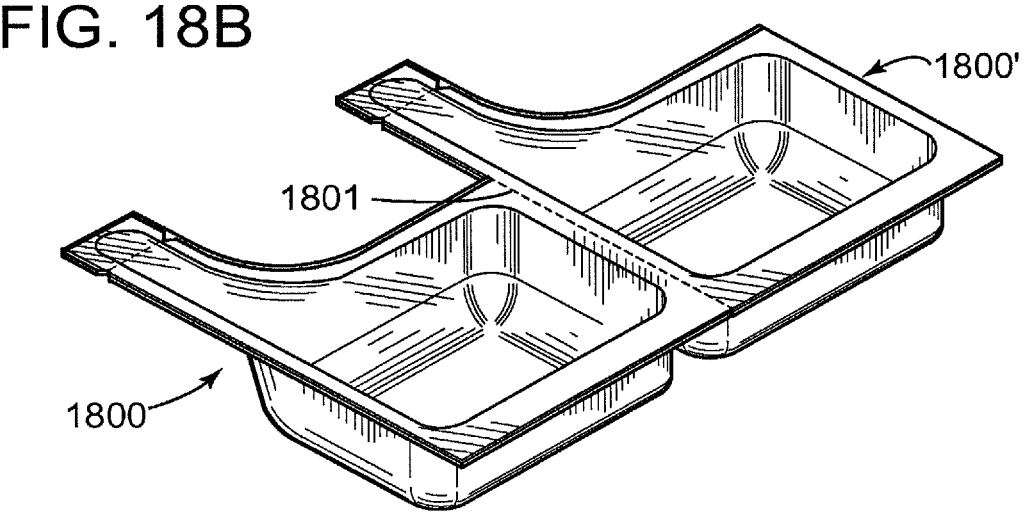
FIG. 18B is a perspective view of the article of FIG. 18A illustrating a parting line.

Referring now to the series of FIGS. 18A, 18B, 19 and 20, there are schematically illustrated representative examples in various arrays of conjoined dispensing packages. FIGS. 18A and 18B illustrate another embodiment in which the individual packages 1800 and 1800' are joined along a line of perforation 1801 to permit their easy separation after purchase. The line of perforation can be a scored or weakened fold to permit the relatively flat faces the packages to be folded into a superposed position and thereby provide a more compact configuration to facilitate handling by the user.

Figure 19:
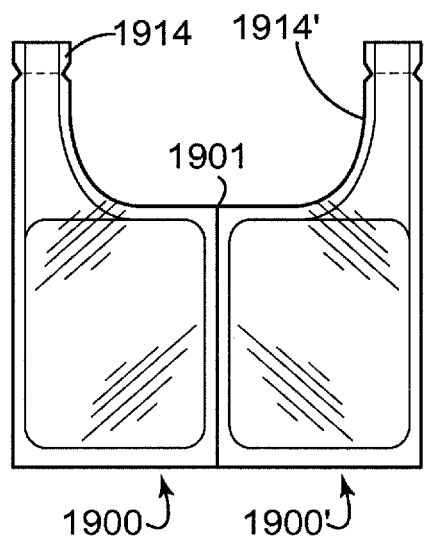
FIGS. 19 and 20 are simplified front elevation views of a plurality of dispensing packages conjoined in illustrative arrays.

In the arrangement of FIG. 19, the packages are joined in a mirror image format with the dispensing tubes 1914, 1914' spaced apart at the maximum distance. The packages are joined along a line 1901 of perforation to permit their easy separation after purchase and that can also serve as a fold line as described above with respect to FIGS. 18A and 18B.]

Figure 20:
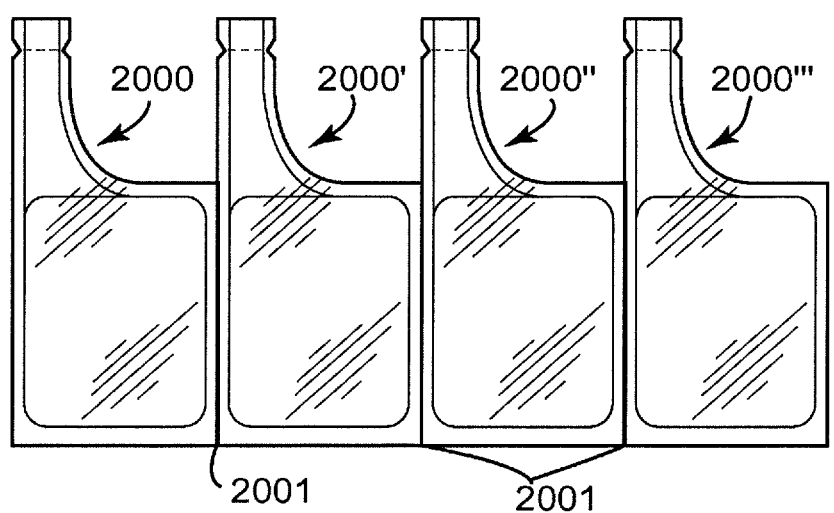

FIG. 20 illustrates another representative example of a plurality of dispensing packages joined together to provide, e.g., four units. This and other similar multiple package arrays can be offered for sale to consumers as a single multi-unit item or, alternatively, where the dispensing packages are separably joined along lines of perforations, the consumer can remove and purchase the number of units desired at the point of sale. It is to be understood that the specific configuration of the individual dispensing packages can be selected from any of those described above, including a single serve with a gusseted base, a multiple-channel dispensing tube and/or a divided container.

While various exemplary embodiments of the invention have been described above and in the attached drawings, further modifications will be apparent to those of ordinary skill in the art from these examples and this description. The scope of the invention is to be determined with reference to the claims that follow.

The invention claimed is:

1. A flexible thermoformed dispensing package for a flowable material, the package produced from one or more heat-sealable polymeric sheets and comprising:
   a. thermoformed container portion that includes a recessed chamber having opposing side walls, top and base walls and bounded by a peripheral area, the chamber configured and arranged to receive the flowable material,
   b. a dispensing tube integrally formed with, and projecting from the container portion and bounded by a contiguous peripheral seal, the dispensing tube defining a dispensing channel configured and dimensioned for passing the flowable material from the chamber, the base of the dispensing tube channel being in fluid communication with the chamber,
   the dispensing tube being spaced apart from the opposing side walls of the recessed chamber, the package container portion and integral dispensing tube being formed from a bottom sheet, c. an internal extension of the dispensing tube that extends into the chamber of the container portion and is formed in a portion of the bottom sheet, the internal extension being defined by a pair of heat-sealable elongated regions extending from the peripheral area adjacent the base of the dispensing tube, each of the heat-sealable elongated regions including the upper surface of an interior partition wall extending to the bottom surface of the recessed chamber, the internal extension terminating in an open end positioned proximate the base wall of the container portion to facilitate withdrawal of the flowable material when the dispensing tube is in a generally vertical orientation, and d. a top cover sheet superposed on, and heat-sealed to the periphery of the bottom sheet and to the elongated region to form a fluid-tight dispensing package.

2. The package of claim 1 in which the dispensing tube and its internal extension are generally centrally positioned intermediate the opposing side walls of the recessed chamber.

3. The package of claim 1 in which an end portion of the interior walls of reduced height extends from the end of the heat-sealable elongated regions to the surface of the bottom of the recessed chamber.

4. The package of claim 1 in which the pair of spaced-apart heat-sealable elongated regions are displaced from the adjacent side walls of the chamber, where the configuration of the surface intermediate the elongated regions is predetermined to define a minimum cross-sectional area of the internal extension below the heat-sealed cover sheet.

5. The package of claim 1 in which the pair of neat-sealable elongated regions are parallel.

6. The package of claim 1 in which the portion of the cover sheet above the dispensing tube is pleated.

7. The package of claim 1 which comprises a mounting panel that is contiguous to the periphery of the container portion and includes one or more openings dimensioned and configured to receive retail mounting and display fixtures.

8. The package of claim 1 which comprises an integrally formed sealed pocket contiguous to the periphery of the container portion, the pocket configured and dimensioned to receive a three-dimensional article and/or non-fluid material.

9. The package of claim 8 which includes weakened parting lines to separate the pocket from the package and/or to facilitate opening of the sealed pocket to gain access to its contents.

10. The flexible thermoformed dispensing package of claim 1 which includes an integrally formed article comprising at least one sleeve or pocket, or both positioned adjacent the container portion and joined to the dispensing package along a weakened parting line to facilitate manual separation of the dispensing package from the article.

11. The dispensing package of claim 10 in which the integrally formed article is a panel adapted to receive printed indicia.

12. The dispensing package of claim 10 in which the integrally formed article comprises a sleeve or pocket adapted to receive contents, the sleeve or pocket having a thermosealed margin and one or more weakened parting lines inward of the sealed margin to facilitate the manual removal of a sealed margin to gain access to the contents of the interior of the sleeve or pocket.

13. The dispensing package of claim 10 in which the margins of the dispensing package and the integrally formed article include weakened or scored lines to facilitate folding of the article to a position superposed on the dispensing package.

14. The package of claim 1 which includes a folded gusset portion formed between the cover sheet and bottom sheet and positioned opposite the peripheral position of the dispensing tube, the folded edges of the gusset being heat-sealed together and to the adjacent periphery of the bottom sheet and cover sheet to form a fluid-tight seal.

15. The package of claim 14 in which the cover sheet and gusset portion are integral with the bottom sheet and formed from a single sheet.

16. The package of claim 14 in which the gusset portion is integral with the bottom sheet.

17. The package of claim 14 where the gusset portion and cover sheet are integral.

18. The package of claim 14 in which the gusset is formed from a separate sheet.

19. The package of claim 14 in which the container portion is dimensioned and configured to support the extended gusset in a generally vertical position on a horizontal surface.

20. The package of claim 14, in which the heat-sealable elongated region terminates above the gusset and provides fluid communication between the recessed chamber and the open end of the internal extension.

21. A flexible thermoformed dispensing package for a flowable material, the package produced from one or more heat-sealable polymeric sheets and comprising:

a. a thermoformed container portion that includes a recessed chamber defined by a peripheral area, the chamber configured and arranged to receive the flowable material, b. a dispensing tube integrally formed with, and projecting from the container portion to define a channel that is in fluid communication with the chamber, the package container portion and integral dispensing tube being harmed from a bottom sheet, c. a separate length of a preformed hollow tube open at both ends that is disposed in the channel of the dispensing tube and extends into the container portion, the upper longitudinal surface of the hollow tube being positioned at approximately the level of the peripheral area of at least the dispensing tube, and d. a cover sheet superposed on, and heat-sealed to the bottom sheet around the periphery of the package, whereby the heat-sealed cover sheet contacts and secures the hollow tube in position in the package.

22. The package of claim 21 in which the end of the preformed hollow tube in the recessed chamber is configured to facilitate passage of fluid into the preformed hollow tube if its end is in contact with an adjacent wall of the chamber.

23. The package of claim 21 in which the sealed end of the dispensing tube includes an opening proximate the end of the preformed hollow tube, the opening covered with a manually-releasable fluid-tight sealing flap dimensioned and configured so that the user can open the flap to access the tube to withdraw contents from the package and reseal the opening after use.

24. A flexible thermoformed dispensing package for a flowable material, the package produced from one or more heat-sealable polymeric sheets and comprising:

a. thermoformed container portion that includes a recessed chamber having opposing side walls, top and base walls and bounded by a peripheral area, the chamber configured and arranged to receive the flowable material and defined by a bottom wall extending between opposing side walls, b. a dispensing tube integrally formed with, and projecting from the container portion and bounded by a contiguous peripheral area, the dispensing tube defining a dispensing channel, the base of the dispensing tube channel being in fluid communication with the chamber, the package container portion and integral dispensing tube being formed from a bottom sheet, c. at least one dividing wall extending from the peripheral area at the sealed end of the dispensing tube and passing through the container portion and terminating at a juncture with a side wall or base wall, the at least one dividing wall extending from the bottom surface of the recessed chamber and having an upper heat-sealable elongated region, d. a top cover sheet superposed on, and heat-sealed to the periphery of the bottom sheet and to the top surface of at least one dividing wall along the elongated region to form at least two fluid-tight compartments in the dispensing package.

25. The dispensing package of claim 24 in which the sealed end of the dispensing tube includes a weakened transverse parting line to facilitate manual removal of the sealed end for dispensing of the contents of the package.

26. The dispensing package of claim 24 with one dividing wall that is configured and positioned to divide a flowable material contained in the filled package into equal portions.

27. The dispensing package of claim 24 in which the sealed end of the dispensing tube further includes a weakened longitudinal parting line that extends through the dividing wall along the length of the dispensing tube, whereby upon opening of the longitudinal parting line, the dispensing tube can be formed into separate flexible channels for separately dispensing the contents of each of the chambers defined by a dividing wall.

28. A plurality of flexible thermoformed dispensing packages of claim 1 that are joined to each other along a manually separable weakened parting line to form a unitary array.

29. The unitary array of claim 28 in which the packages are joined adjacent the side wall of their respective container portions with their dispensing tubes in the same position relative to the container portion.

* * * * *